US012299041B2

(12) United States Patent
Snyder et al.

(10) Patent No.: US 12,299,041 B2
(45) **Date of Patent: *May 13, 2025**

(54) METHOD AND SYSTEM FOR ABSTRACTING INFORMATION FOR USE IN LINK ANALYSIS

(71) Applicant: Pulselight Holdings, Inc., Austin, TX (US)

(72) Inventors: Jim Snyder, Cedar Park, TX (US); Joon Hao Chuah, Austin, TX (US); Joe Dente, Austin, TX (US); Travis Hartwell, Austin, TX (US); Morgan Hollinger, Austin, TX (US); John Thele, Austin, TX (US); Jimmy Wan, Austin, TX (US); Robert Williams, Austin, TX (US); Robby Morgan, Austin, TX (US)

(73) Assignee: Pulselight Holdings, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/240,320

(22) Filed: Aug. 30, 2023

(65) Prior Publication Data

US 2023/0409638 A1 Dec. 21, 2023

Related U.S. Application Data

(63) Continuation of application No. 17/368,717, filed on Jul. 6, 2021, now Pat. No. 11,762,909, which is a (Continued)

(51) Int. Cl.
*G06F 16/00* (2019.01)
*G06F 16/28* (2019.01)

(Continued)

(52) U.S. Cl.
CPC ........ *G06F 16/9024* (2019.01); *G06F 16/287* (2019.01); *G06Q 30/02* (2013.01)

(58) Field of Classification Search
CPC . G06F 16/9024; G06F 16/287; G06F 16/9027
See application file for complete search history.

(56) References Cited

U.S. PATENT DOCUMENTS 6,714,936 B1 * 3/2004 Nevin, III ........... G06F 16/9024 703/2
7,580,947 B2 * 8/2009 Kasravi ................. G06F 16/289 707/999.102

(Continued)

*Primary Examiner* — Leslie Wong
(74) *Attorney, Agent, or Firm* — J. Roger Williams, Jr.

(57) ABSTRACT

Observable data points are collected and organized into a link-oriented data set comprising nodes and links. Information is abstracted for use in link analysis by generating links between the collected data points, including deriving links and inducing links. A link can be induced by linking together a pair of nodes that satisfy a distance function. Exemplary distance functions that can be used to induce links include geospatial proximity, attribute nearness, and name similarity. Paths can be identified between selected nodes of interest through a dataset operation, and nodes and/or links can be selectively included or excluded from the data set operation. The dataset can be augmented with pedigree information or one or more association nodes. Link information, including a trajectory and a connected path that selectively produces or excludes one or more intermediate nodes, can be displayed and/or produced in a specified format.

20 Claims, 21 Drawing Sheets

Related U.S. Application Data continuation of application No. 15/990,421, filed on May 25, 2018, now Pat. No. 11,055,350, which is a continuation of application No. 12/747,868, filed as application No. PCT/US2008/086729 on Dec. 12, 2008, now abandoned.

(60) Provisional application No. 61/013,273, filed on Dec. 12, 2007.

(51) Int. Cl.

| | |
|---|---|
| ***G06F 16/901*** | (2019.01) |
| ***G06Q 30/02*** | (2023.01) |

(56) References Cited

U.S. PATENT DOCUMENTS

| | | | | |
|---|---|---|---|---|
| 9,015,171 | B2 * | 4/2015 | Bayliss | G06Q 10/10<br>707/739 |
| 11,074,299 | B2 * | 7/2021 | Broyd | G06F 16/90335 |
| 2006/0053175 | A1 * | 3/2006 | Gardner | G16H 70/00<br>707/999.203 |
| 2006/0085370 | A1 * | 4/2006 | Groat | G06F 16/9024 |
| 2007/0124291 | A1 * | 5/2007 | Hassan | G06F 16/34<br>707/E17.093 |
| 2020/0265090 | A1 * | 8/2020 | Hilloulin | G06F 16/9024 |

* cited by examiner

Figure 6:
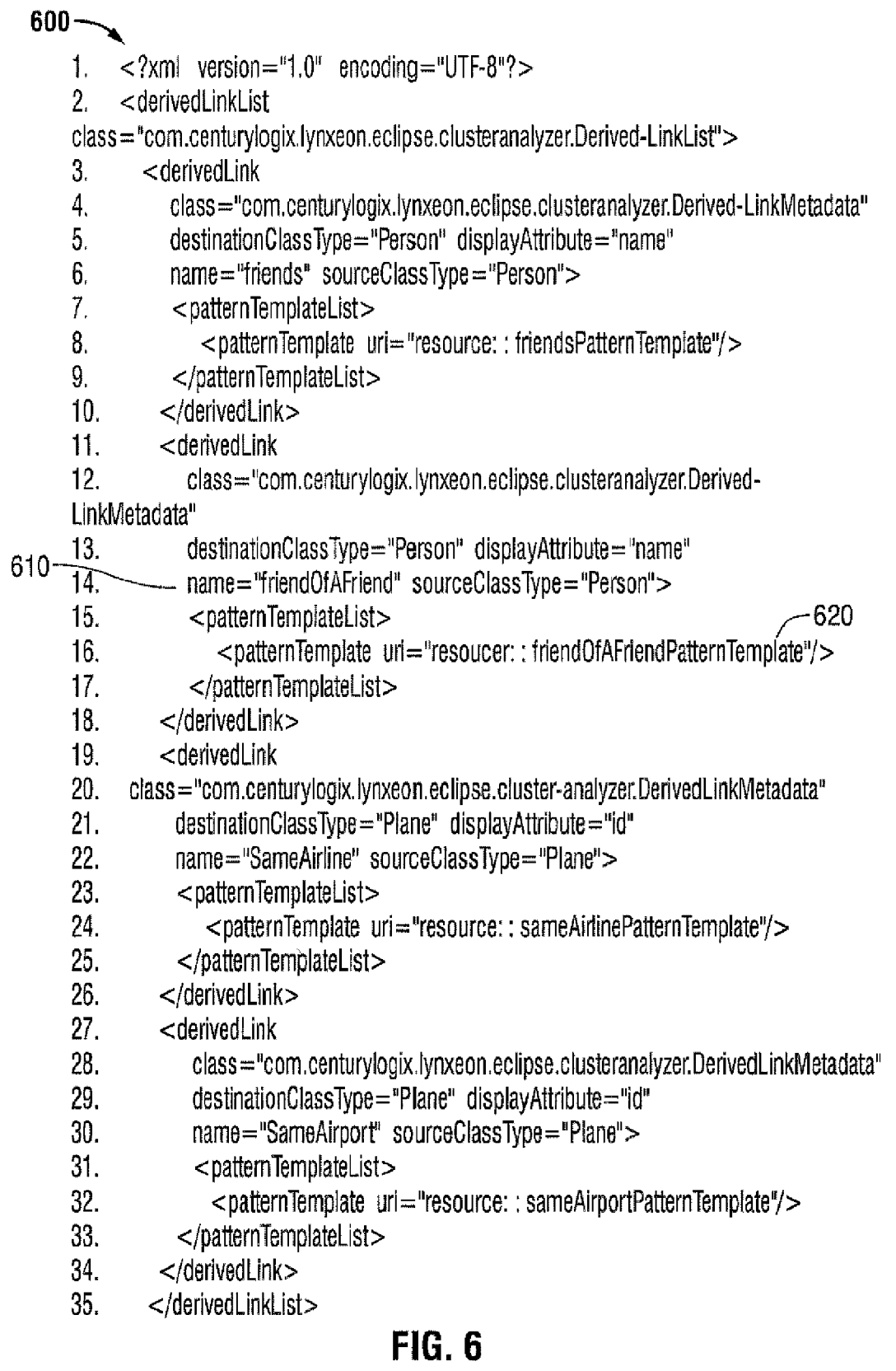

600

```
<?xml version="1.0" encoding="UTF-8"?>
<derivedLinkList
class="com.centurylogix.lynxeon.eclipse.clusteranalyzer.Derived-LinkList">
  <derivedLink
    class="com.centurylogix.lynxeon.eclipse.clusteranalyzer.Derived-LinkMetadata"
    destinationClassType="Person" displayAttribute="name"
    name="friends" sourceClassType="Person">
    <patternTemplateList>
      <patternTemplate uri="resource: : friendsPatternTemplate"/>
    </patternTemplateList>
  </derivedLink>
  <derivedLink
    class="com.centurylogix.lynxeon.eclipse.clusteranalyzer.Derived-
LinkMetadata"
    destinationClassType="Person" displayAttribute="name"
    name="friendOfAFriend" sourceClassType="Person">
    <patternTemplateList>
      <patternTemplate uri="resoucer: : friendOfAFriendPatternTemplate"/>
    </patternTemplateList>
  </derivedLink>
  <derivedLink
class="com.centurylogix.lynxeon.eclipse.cluster-analyzer.DerivedLinkMetadata"
    destinationClassType="Plane" displayAttribute="id"
    name="SameAirline" sourceClassType="Plane">
    <patternTemplateList>
      <patternTemplate uri="resource: : sameAirlinePatternTemplate"/>
    </patternTemplateList>
  </derivedLink>
  <derivedLink
    class="com.centurylogix.lynxeon.eclipse.clusteranalyzer.DerivedLinkMetadata"
    destinationClassType="Plane" displayAttribute="id"
    name="SameAirport" sourceClassType="Plane">
    <patternTemplateList>
      <patternTemplate uri="resource: : sameAirportPatternTemplate"/>
    </patternTemplateList>
  </derivedLink>
</derivedLinkList>
```

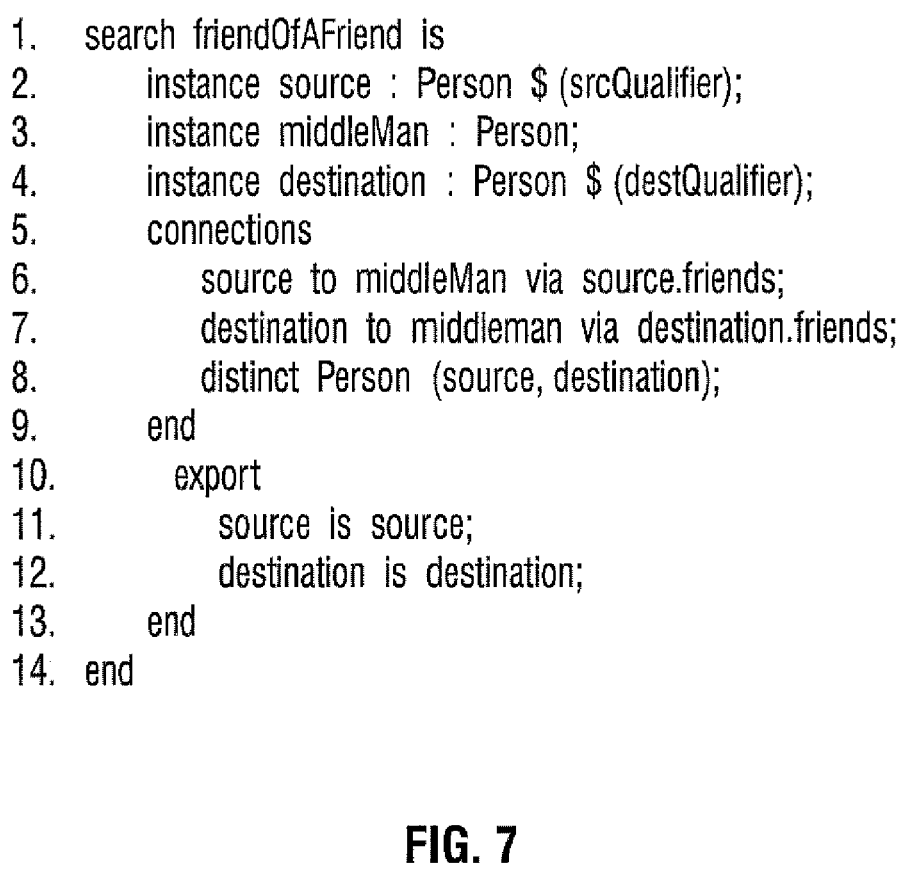

```
search friendOfAFriend is
    instance source : Person $ (srcQualifier);
    instance middleMan : Person;
    instance destination : Person $ (destQualifier);
    connections
        source to middleMan via source.friends;
        destination to middleman via destination.friends;
        distinct Person (source, destination);
    end
      export
        source is source;
        destination is destination;
    end
end
```

FIG. 7

| subject | point type | coordinate | start time | end time | |
|---|---|---|---|---|---|
| John | AddressableLocation | 30.588202,-97.657592 | Jan 2 11:23 | Jan 2 11:45 | 1573 |
| John | PhoneTower | 30.388202,-97.620 | Jan 2 13:52 | Jan 2 14:08 | 1576 |
| John | AddressableLocation | 30.588202,-97.657592 | Jan 2 14:32 | Jan 2 15:10 | 1579 |

```
<geospatial id="Person_sightings" label="Person Sightings" subjectClass="Person" supercedes="AddressableLocation_location">
  <searchSubgraph id="Person" label="">
    <expand typeName="Person" inRelations="" outRelations="primaryName,sightings"/>
  </searchSubgraph>
  <pointDescriptors>
    <pointDescriptor pointClass="AddressableLocation">
      <context path=".">
        <value id="UID" path="UID" label="UID"/>
        <value id="disposition" path="disposition" label="Disposition"/>
        <value id="immigrationStatus" path="immigrationStatus" label="Immigration Status"/>
        <value id="primaryLanguage" path="primaryLanguage" label="Primary Language"/>
        <value id="race" path="race" label="Race"/>
        <value id="sex" path="sex" label="Sex"/>
        <value id="SSN" path="SSN" label="SSN"/>
        <context path="primaryName">
          <value id="Label" path="fullName" label="Full Name"/>
        </context>
        <context path="sightings">
          <value id="Begin" path="beginDate" label="Location Begin Date"/>
          <value id="End" path="endDate" label="Location End Date"/>
          <value id="confidence" path="confidence" label="Location Confidence"/>
          <value id="isCurrent" path="isCurrent" label="Location Current"/>
          <context path="association">
            <value id="Location" path="geocoordinate" label="Location"/>
            <value id="city" path="city" label="Location City"/>
            <value id="country" path="country" label="Location Country"/>
            <value id="county" path="county" label="Location County"/>
            <value id="geocodeMatching" path="geocodeMatching" label="Location Geocode Matching"/>
            <value id="name" path="name" label="Location Name"/>
            <value id="postalCode" path="postalCode" label="Location Postal Code"/>
            <value id="postalExtensionCode" path="postalExtensionCode" label="Location Postal Extension Code"/>
            <value id="state" path="state" label="Location State"/>
            <value id="streetCategory" path="streetCategory" label="Location Street Category"/>
            <value id="streetExtension" path="streetExtension" label="Location Street Extension"/>
            <value id="streetFullText" path="streetFullText" label="Location Street Full Text"/>
            <value id="streetName" path="streetName" label="Location Street Name"/>
            <value id="streetNumber" path="streetNumber" label="Location Street Number"/>
          </context>
        </context>
      </context>
    </pointDescriptor>
  </pointDescriptors>
</geospatial>
```

FIG. 16

METHOD AND SYSTEM FOR ABSTRACTING INFORMATION FOR USE IN LINK ANALYSIS

RELATED PATENTS/PRIORITY CLAIM

This application is a continuation of co-pending U.S. Non-Provisional application Ser. No. 17/368,717, filed 6 Jul. 2021, which is scheduled to issue on Aug. 30, 2023, which application is a continuation of U.S. Non-Provisional application Ser. No. 15/990,421, filed 25 May 2018, which issued on Jul. 6, 2021 as U.S. Pat. No. 11,055,350, which application is a continuation of U.S. Non-Provisional application Ser. No. 12/747,868, filed 16 May 2011, abandoned, which application claims the benefit of PCT Application No. PCT/US2008/086729, filed 12 Dec. 2008, which application claims the benefit of U.S. Provisional Application No. 61/013,273, filed 12 Dec. 2007. The contents of the foregoing applications are incorporated in their entireties.

TECHNICAL FIELD

The invention relates generally to a method and system for abstracting or transforming data stored in a link-oriented data set for use in link analysis.

BACKGROUND

Over the past several decades, criminal and terrorist networks have evolved the sophistication by which they finance, organize and communicate. These changes are reflected in events from September 11 to violent crimes associated with drug trafficking to Improvised Explosive Devices used all over the globe. Both law enforcement and military intelligence agencies are charged with detecting, disrupting, and dismantling these human networks in an attempt to combat what has been called asymmetric threats.

An effective technique used to understand and combat these kinds of threats is Link Analysis-the modeling of high-level networks and linkages between people, organizations, and events to gain insight into the weak or unknown portions so that some action can be taken against these networks. FIG. 1 illustrates generally how information flows during an exemplary intelligence analysis cycle 100, and includes some major transition points that have direct relevance to tools and technologies supporting analysts. Information is collected from and by various sources and methods, and its collection is highly dependent on the disciplines involved; this information is usually collected independently or indirectly from the analytical cycles that exploit it. The analysis phase is highly subjective with respect to the skills and training of individual analysts and agencies, and it includes manual and computational techniques that can establish relevant relationships in support of a perspective or recommendation. The preparation phase is a graphical information presentation (e.g. network chart) workflow that attempts to visually communicate the "punch line" of an analytical process, that is, a condensed information model is drawn. Lastly, the presentation phase is typically the assembly and production of some kind of media that can be presented or distributed for human consumption.

What is important to note about this process is that it involves lots of people, organizations, and systems whereby information is searched, analyzed, and organized in highly manual and individual ways. Two kinds of computational tool support that are relevant for this problem area are link charting and computational link analysis.

Link Charting. Computer support for the preparation phase of the analysis process has been widely supported by a variety of commercial tools such as Analyst Notebook, Centrifuge, and Visual Analytics. These tools focus on aiding the preparation of visually compelling or communicative information so that the analytical results can be consumed by the intended audience. However, the proportion of time spent on the preparation phase is relatively small because these tools amount to task-specialized drawing tools much like tools such as Visio or PowerPoint are to presentation. The difficult task of wielding large amounts of information or applying computationally intensive methods to information is ignored by this class of tool.

As a result, analysts are compelled to assemble a set of disconnected tools that are difficult to use in a uniform or smooth technique, and they must also develop ad hoc (and often manual) processes to manage the information discovery and exploration tasks through their analysis methodology. An additional consequence is that standard intelligence practices are hard to reproduce as they are intermingled with the tool integration approaches themselves; as tools change, the process changes or they way in which an analyst uses a tool can change thereby making processes brittle and reproducibility difficult. There is an unmet need for improved computer support of analysis and not just preparation.

Computational Link Analysis. Simply stated, Link Analysis includes the methods and techniques used to produce the information that feeds the presentation phase of the analysis process. The goal is to incrementally capture, understand, refine, and analyze Human Activity Networks such that latent or non-obvious relationships can be discovered and definitive actions can take place such as arrests, intelligence targeting, or threats being eliminated.

While many techniques for Link Analysis are known, they have traditionally been manual and impractical to implement computationally or at Technical Needs of Computational Link Analysis Methods scale. For example, matrix operations can be used to find associations between people but cannot be used frequently, in large part, due to the difficulty of capturing relevant information because many things need to come together to make robust computational link analysis feasible. For example, algorithms, software architectures, hardware performance, global-scale networking, and commoditized large data stores need to converge at once to provide computational support.

A goal of computational link analysis is to create a synergistic behavior between human analysts and computers where information intensive tools and techniques can aid analysts in "zeroing in" on relevant understanding or abstracting the linkages between information. Said differently, computers should do what they do best (which is lots of dumb calculations quickly) and analysts should do what they do best-reason and analyze.

Link Analysis can be used to identify and qualify high-level links in Human Activity Networks (HANs). These links are combinations of many kinds of simple and complex linkages and pathways in link-oriented data and very often are manually constructed or simply drawn in pictures. Presented here is a technology solution that allows such high-level links to be realized in computation link analysis technologies.

BRIEF SUMMARY

Disclosed are a method and computer system for improving the efficiency of computational link analysis performed by a computer system, the computer system including a link-oriented data set comprising collected observable data that has been organized into typed nodes and typed edges comprising observable data edge-types, and, using a computational process, adding first and second synthesized edges between first and second pairs of typed nodes, whereby the synthesized edges reveal associations that are not expressed in the collected observable data, and storing the link-oriented data set with the synthesized edges. The first synthesized edge has a new derived edge-type, not an observable data edge-type, defined using link derivation comprising software instructions that specify dataset operations comprising other edge types. The second synthesized edge has a new induced edge-type, not an observable data edge-type, defined using link induction comprising software instructions that specify functions operating on node values.

Additional embodiments are disclosed for producing node and edge information, creating a synthesized connected path comprising an intermediate node, and producing simplified path information. The methods and systems disclosed herein transform the link and node organization of collected information into a form and/or format that is more useful to the analyst.

DESCRIPTION OF THE DRAWINGS

FIG. 6 depicts an XML specification for possible Derived Links in an embodiment.

FIG. 7 depicts an example of a pattern query used to derive a Derived Link in an embodiment.

FIGS. 15*a*, 15*b* and 15*c* illustrate stages of an exemplary process for extracting a trajectory for an entity.

FIG. 16 depicts an exemplary trajectory path definition of one mappable point for a Person node type in an embodiment.

DETAILED DESCRIPTION

Figure 1:
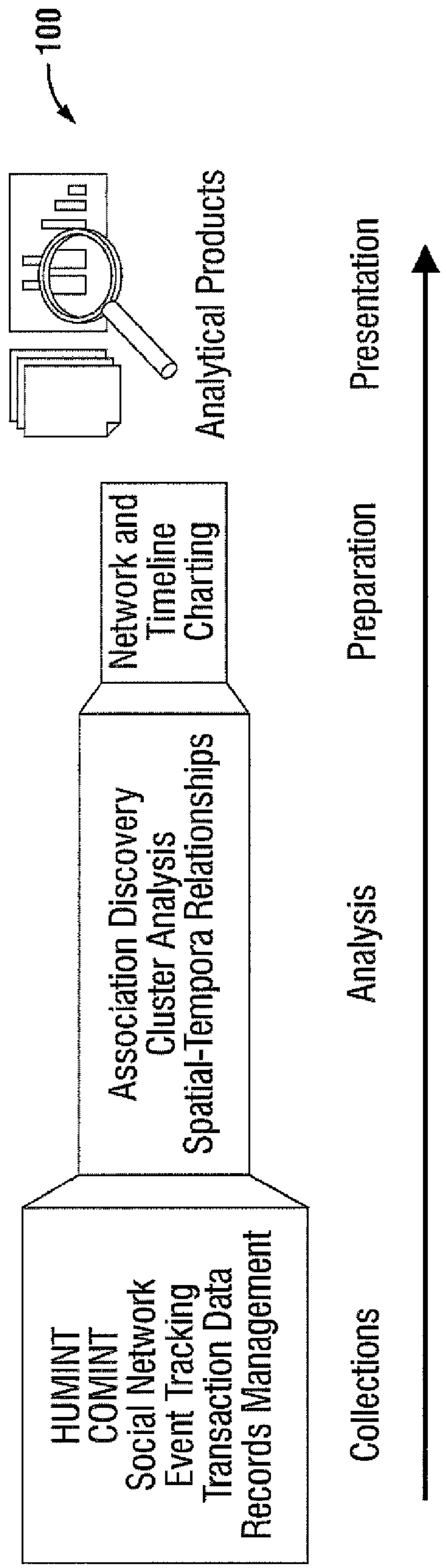
FIG. 1 depicts a high level view of an intelligence analysis cycle.
Figure 2:
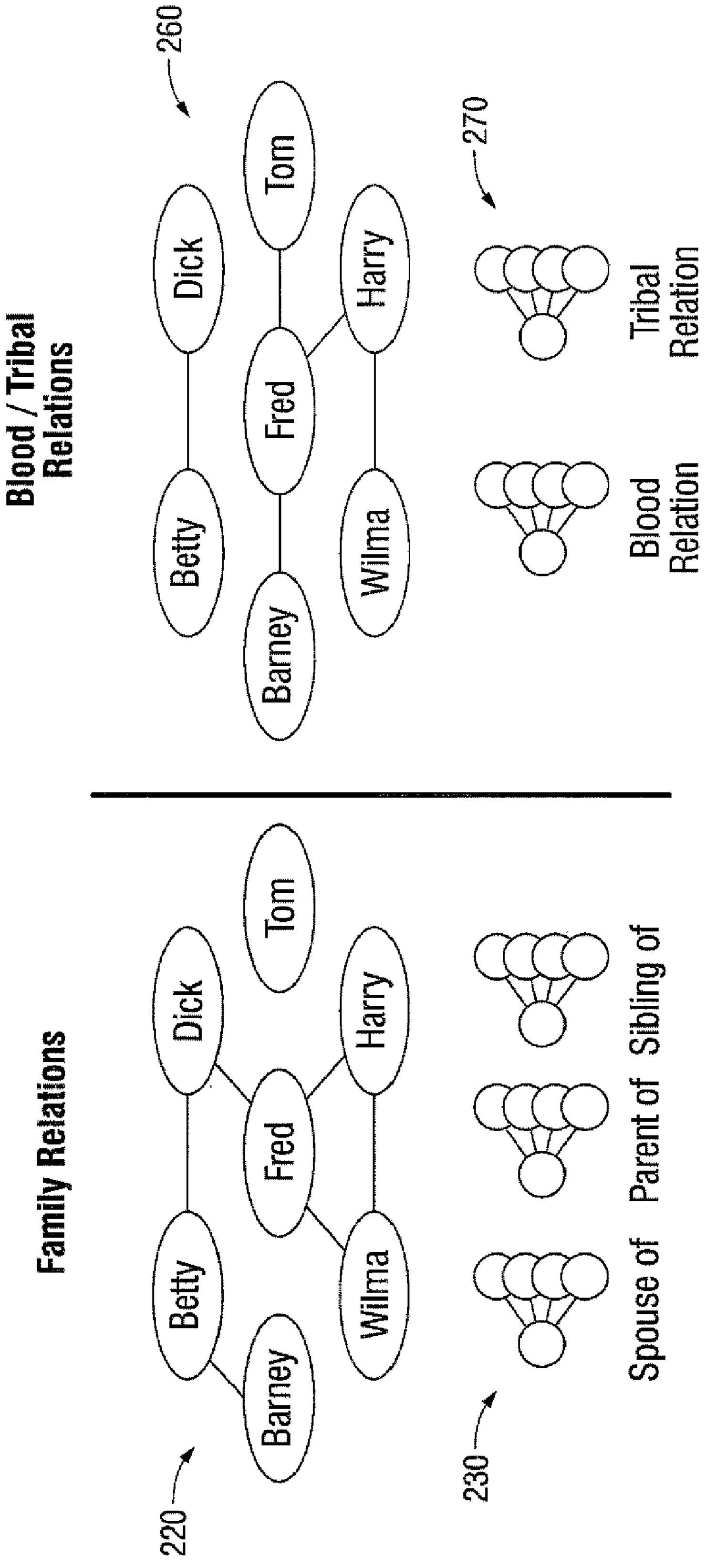
FIG. 2 depicts exemplary link variations within a sample population.

Technical Needs of Computational Link Analysis Methods. Very often in link analysis, analysts need to show how people are "connected" to each other or hypothesize that people are connected, and then analysis results are combined to establish a non-obvious linkage. FIG. 2 shows how two different linkages between the same set of people can help illustrate what person is potentially exploitable from a targeting perspective. The potentially exploitable persons can be identified by constricting two networks, one from the perspective of being part of the family by marriage and one from the perspective of being in the blood or tribal network.

What the example shows is the need to abstract or derive many kinds of relationships such as spouse Of or parent Of into the logical grouping of family-MemberOf. However, the vast number of ways that these relationships exist and need to be stated presents a serious technical challenge. Moreover, the definitions of these relationships will change over time as more is learned about the discipline, the network itself, or how data is collected. Therefore, it may be neither possible nor feasible to enumerate all the possible linkages of the data before the data is collected or analyzed. Association Discovery and Cluster Analysis are two computational analysis methods useful in deriving or identifying data linkages of interest.

Association Discovery is the process of finding linkages between two or more entities given a variety of complicated or convoluted pathways between them. For example, it can be inferred that two people know each other because they lived at the same place or they committed crimes together or they belong to the same gang, or even they give common information such as the same phone number. Additionally, associations between people can be inferred when the people show up at physical locations together or know many of the same people in the same area or are in proximity to a large number of similar crime locations.

As these associations are built up, linkages can be combined together (possibly with other links) to form a network of activity. Often these networks are focused around a particular theme such as crimes. To support a more general approach of building networks around multiple activities, a more general network structure, such as a Human Activity Network, can be used.

Figure 8A:
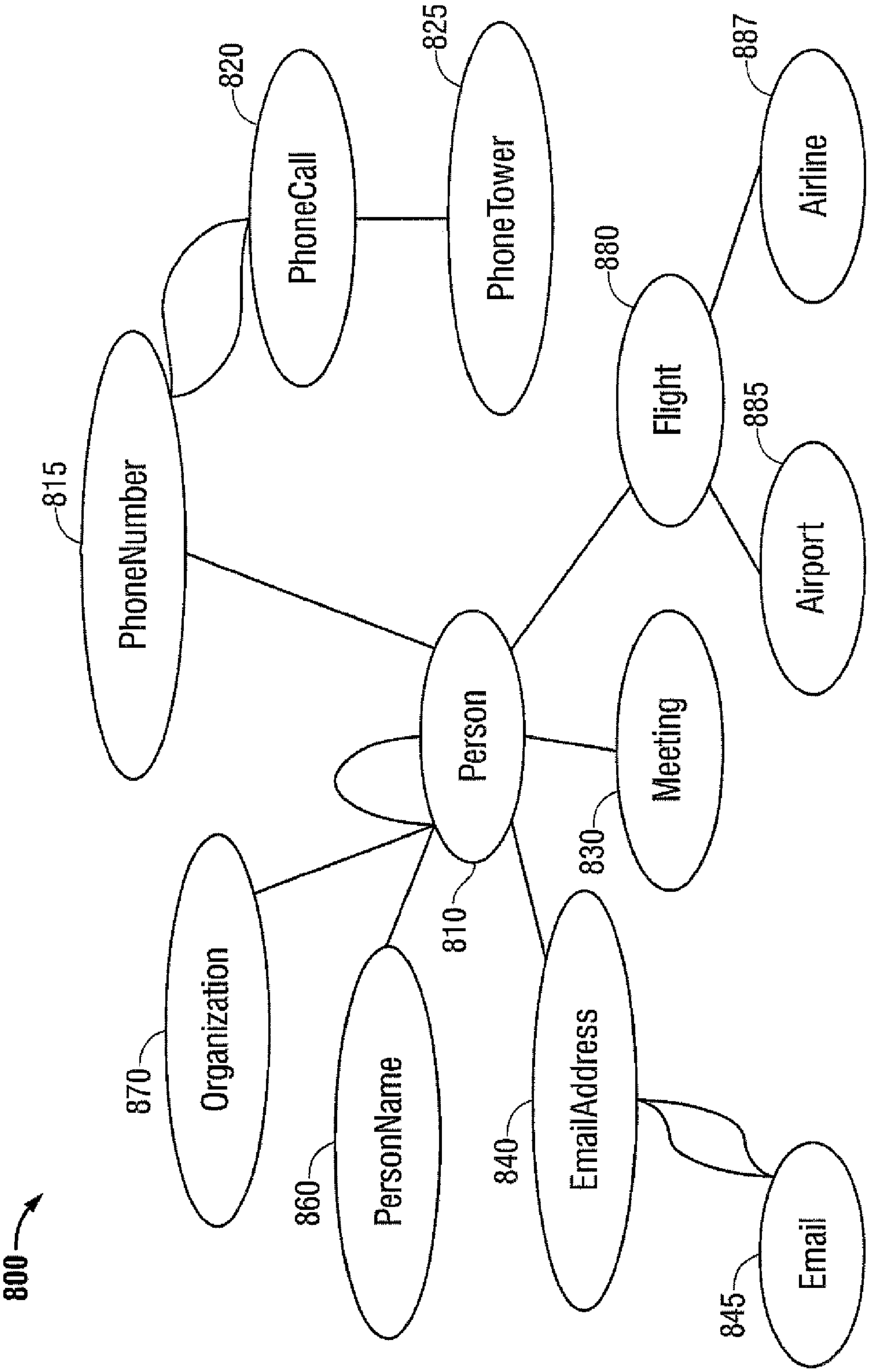
FIGS. 8*a* and 8*b* illustrate an exemplary application of type exclusion to enhance Association Discovery.
Figure 8B:
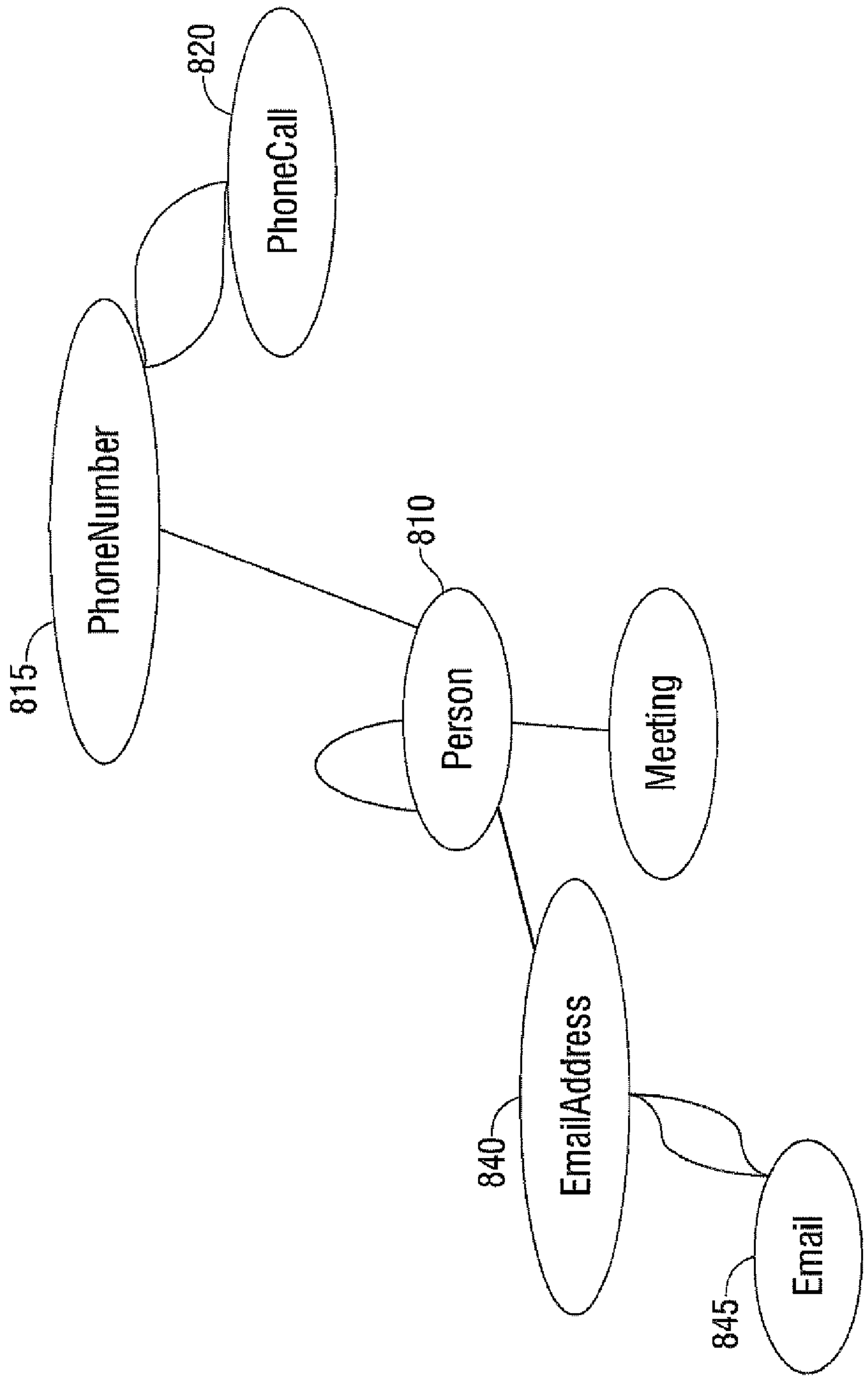

When considering paths that may connect entities, preferably the analyst has the ability to selectively include or exclude entity types as intermediaries as path candidates. For example, to discover methods used by individuals for communication, it might be beneficial to exclude non-communication pathways for consideration. This may be accomplished by excluding entity types. FIGS. 8*a* and 8*b* illustrate an exemplary application of this technique. FIG. 8*a* shows source data model 800 comprising exemplary entity types, including person 810, PhoneNumber 815, PhoneCall 820, PhoneTower 825, Meeting 830, EmailAddress 840, Email 845, PersonName 860, Organization 870, Flight 880, Airline 887, and Airport 885. Some of these types (e.g., Organization 870, Person Name 860, and Flight-related types (880)) do not directly relate to methods of communication with other persons and can be excluded from display so that the analyst can focus on communication-related data types such as PhoneNumber 815 and EmailAddress 840, as shown in FIG. 8*b*. The ability to selectively include or exclude type for path consideration provides additional tools to the analyst to narrow the results and pinpoint those relative links of interest. Using type exclusion also reduces the search space for Association Discovery which improves the efficiency of the search. An embodiment allows the analyst several ways to selectively include or exclude types for path consideration, including rules-based techniques and manual selection.

Cluster Analysis is a complementary technique to Association Discovery in that once a high-quality abstracted network has been built, people (or other nodes) in the network can be clustered based on their associations. (Other names for his technique include Group Detection or Community Extraction). Referring back to the example in FIG. 2, two kinds of clusters could be built to compare and contrast the family versus blood networks.

More specifically, most of the algorithmic techniques for clustering (i.e., the technique that produces the clusters) make use of computational linear algebra and require highly abstracted or pristine links. However, the data is not in such a state in its intrinsic form. Typically pre-processing on small data sets is done unless the data is intrinsically collected in pristine network form. An example of this type of data is phone call logs.

Figure 3:
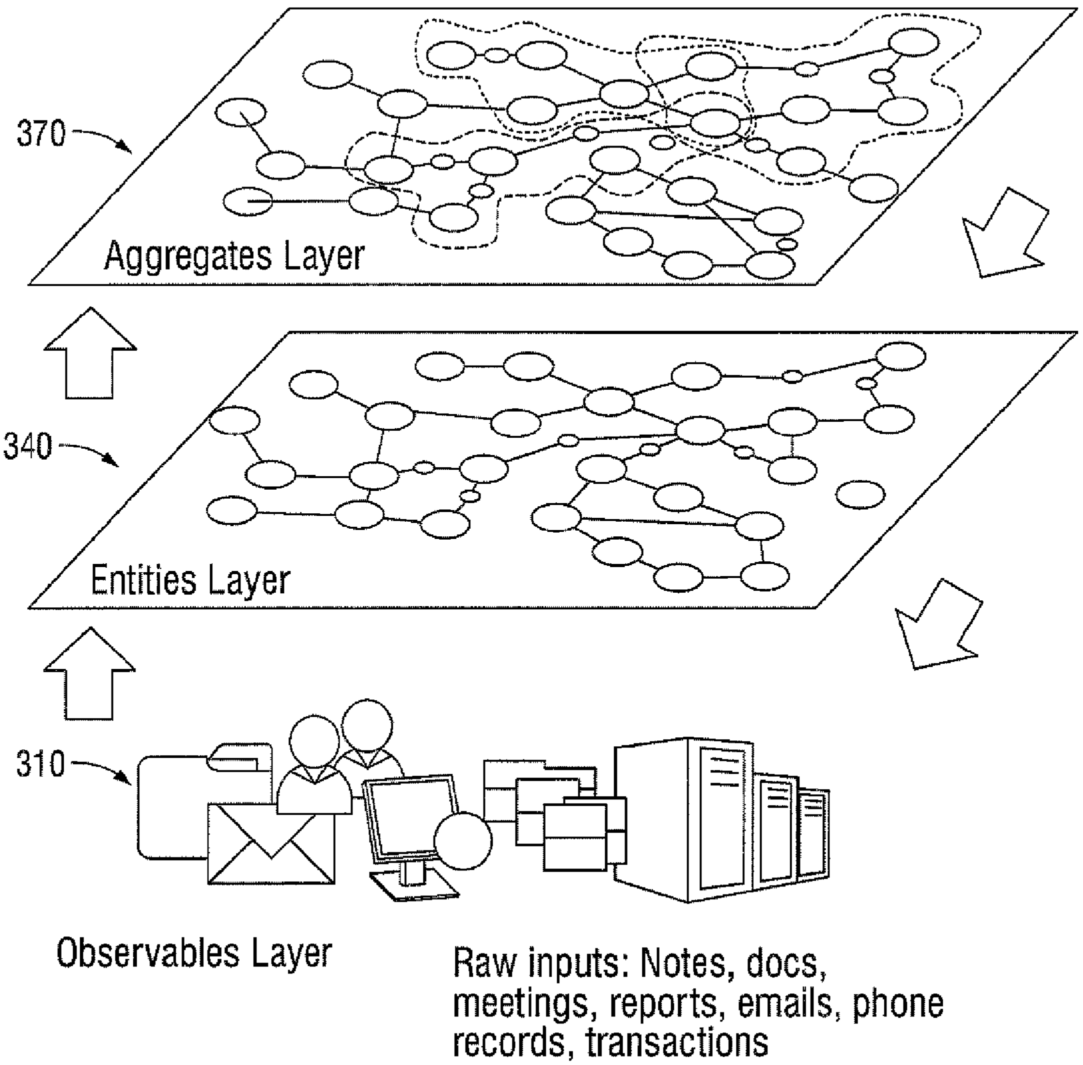
FIG. 3 depicts exemplary information layers.

Information Abstraction in Link Analysis. Typically there is a gap between the information needed by analysts to make analysis decisions and the data collected. This can be illustrated by information abstraction layers. FIG. 3 shows three layers that represent notional stable points in a data storage and representation embodiment, namely the Observables Layer 310, the Entities Layer 340 and the Aggregates Layer 370.

Observables Layer: The data collected throughout the course of normal or daily activity is represented in Observables Layer 310, that is, things that can be observed and/or recorded (e.g., electronically). Examples include email, documents, phone call logs, financial transaction, database records and any other type of data used on, by or with a computer.

Entities Layer: Entities layer 340 reflects qualitative evaluation, refinements and judgments about the data and what it represents specifically with respect to the entities under scrutiny (people, organizations, locations, etc.) For example, in an exemplary embodiment of a Human Activity Network, the Entities Layer would resolve two different names of a person to the same person represented in the network.

Aggregates Layer: The output of Cluster Analysis is an example of what would be represented in Aggregates Layer 370, that is, groups of people can be aggregated into groups. Moreover, people can be aggregated from countless perspectives, and comparison of these variations can show how human networks function. However, the technical requirements of the techniques used to make aggregates cannot just use information represented at the Observables Layer as is.

An important conclusion to draw from this observation about how information needs to be tiered is that there is a gap in how data is collected, processed and stored as compared to how the behaviors of people and organizations via Human Activity Networks can be analyzed and discovered.

In an embodiment, a graph analytics platform provides the technology for generating linkages for use at a high-level of analysis. Preferably the graph analytics platform is implemented in software (which may include portions implemented in hardware). It is assumed that observable (or raw) data has been collected, and the graph analytics platform preferably stores or organizes the collected observable data in a form that is link-oriented, that is, data is organized as Nodes and Links (or edges) between nodes. Exemplary link-oriented data sets include graphs and trees, and can be implemented with relational database technology such as a relational database management system and query language using methods well-known to those of ordinary skill in the art. Nodes have types associated with them (e.g. People) and one ore more attributes and Links are named (e.g. parentOf) and their end points are also typed (e.g. links of People). Attributes are named scalar value properties that express owned aspects of a given Node type (e.g., a person's name, a vehicle's model, or a phone call's duration). The features of the graph analytics platform are not dependent on the definition of any one data set, but can adapt to function against any data set that is or will be defined.

The graph analytics platform includes search and segment matching tools to search the data set efficiently and to match segments or patterns or identify nodes or links that meet specified criteria. Methods and techniques for searching and segment matching, including without limitation graph tools including sub-graph matching and relational database methods, are well-known to those of ordinary skill in the art. In an embodiment the link-oriented data set uses a strongly-typed node and link system, where every node is of an identifiable type such as 'Person' or 'Organization'. Links are typed and connected between identifying node types, such as 'Person memberOf Organization'. In an embodiment, links are typed but do not have attributes, which facilitates scalable, fast pattern matching. Preferably the graph analytics platform uses a strongly-typed link-oriented data, segment matching for data set searches, an efficient storage format and language and use of query languages for building queries, all as described in pending U.S. patent application Ser. No. 11/590,070 filed Oct. 30, 2006 entitled Segment Matching Search System and Method, hereby incorporated by reference. A graph analytics platform preferably also provides pattern search (including graph pattern matching), and management and application development (including client and server tools) functionality. An exemplary embodiment of a graph analytics platform is the Lynxeon Intelligence Analytics Enterprise product suite provided by 21st Century Technologies.

Figure 4:
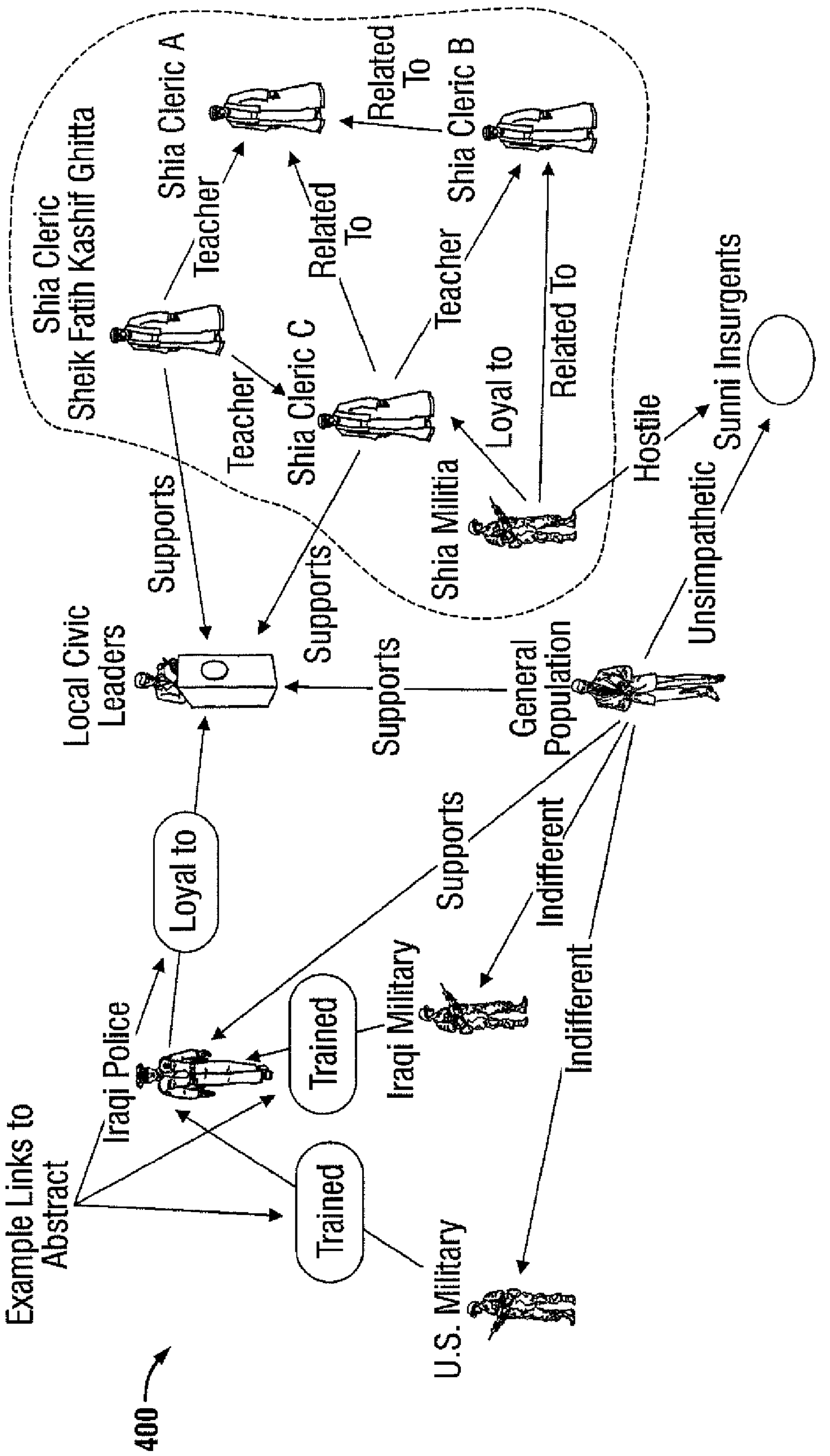
FIG. 4 depicts an exemplary Human Activity Network.

FIG. 4 depicts an exemplary Human Activity Network 400. To analyze the exemplary Human Activity Network 400, it would be helpful to be able to identify links such as loyalTo, trained, etc. The problem is that such data is not necessarily intrinsically available in the captured data.

Figure 5:
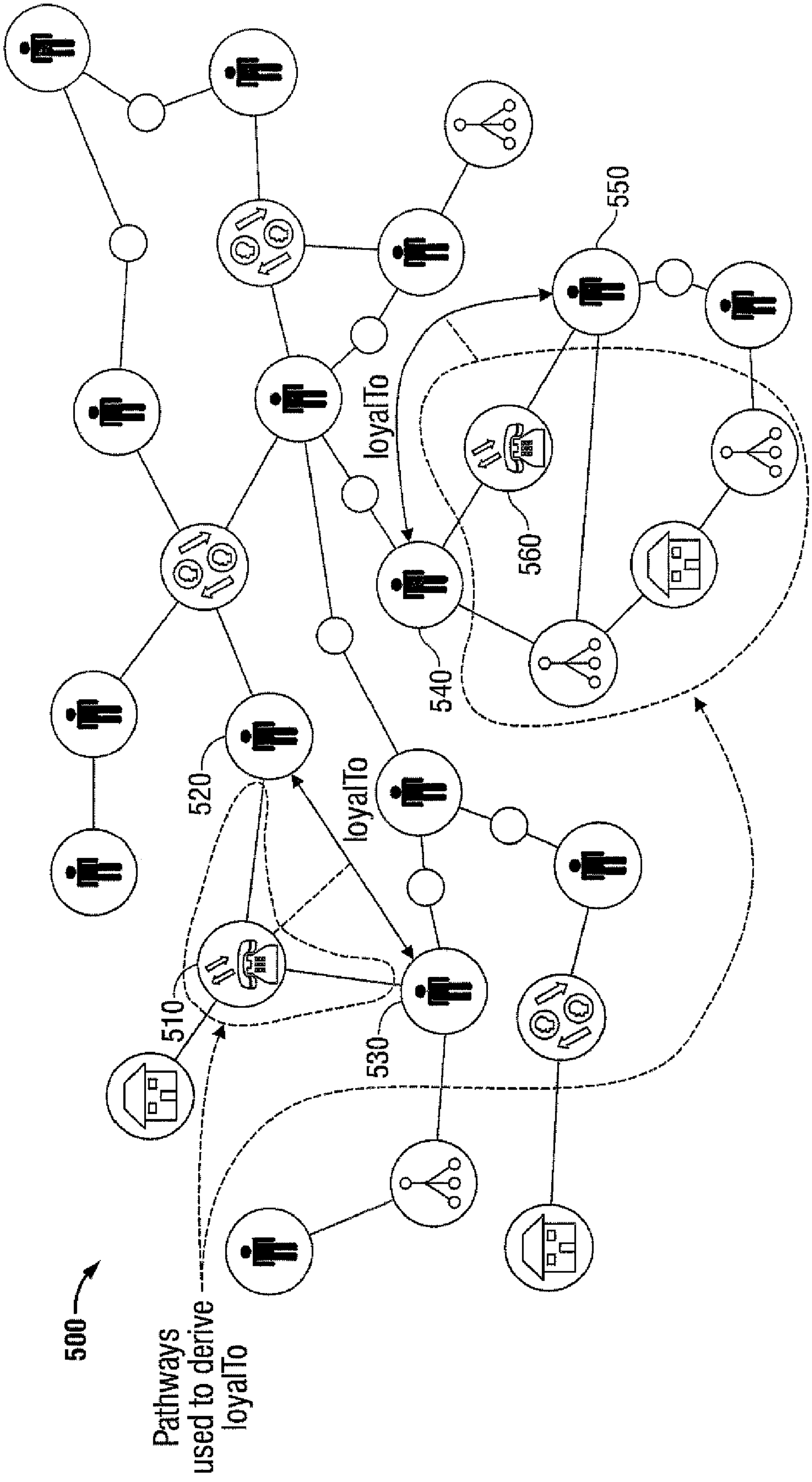
FIG. 5 depicts pathways used to define an exemplary Derived Link within an exemplary Human Activity Network.

It is also assumed that the captured data will not be directly organized like the idealized network 400 from FIG. 4, and there will be more than one way to derive links such as, for example, the link loyalTo. If there are multiple paths or substructures in the data that justify the loyalTo association, it will be valuable to derive all the links that are defined in terms of all these paths, that is, to identify all pairs of nodes where the desired pathways exists between the nodes. A derived link is therefore a mechanism that allows dynamic synthesis of typed links in link-oriented datasets. For a simple exemplary illustration, the derived link loyalTo as someone who calls each other or has met as a safe house as shown in FIG. 5 with highlighted elements. In FIG. 5, for example, there are loyalTo derived links between persons 520 and 530, and between persons 540 and 550, because the observable data shows phone calls between them (510, 560).

In an embodiment, Derived Links can be generalized as the set of typed edges (i.e. typed node pairs) that are the result of a disjunctive set of subgraph matching operations. Those of ordinary skill in the art will appreciate that other dataset operations such as, by way of non-limiting example, pattern matching or matrix operations, can be used in addition to, or instead of, subgraph matching operations, and further, that the results may be aggregated in whole or in part, excluded in whole or in part, or otherwise operated upon in any number of ways to generate a set of typed edges. While there may be special cases in some embodiments (for example the nodes may have to be the same type or capable of path discovery via linear algebra), the general idea allows a solution to be cast in many technology implementations. A characteristic of one embodiment is to defer the generation of such linkages as late as possible while balancing the computational efficiency to produce answers sufficiently quickly.

FIGS. 6 and 7 illustrate an embodiment implemented using Lynxeon in which Derived Links can be used to condition link-oriented data to perform cluster analysis. FIG. 6 shows an XML specification 600 of the possible Derived Links for a particular schema. Line 14 (610) shows that the Derived Link "friendOfAFriend" is defined using a pattern query that is based on graph matching approaches. FIG. 7 is an example of a pattern query that is referenced in the Derived Link Specification of FIG. 6 (see 620). The exported output of the pattern (710) in this embodiment includes a source and destination node that ultimately is consumed as a typed edge. In the example shown in FIGS. 6 and 7, friends is a Derived Link that is derived from other data, e.g., observable data. The Derived Link "friendOfAFriend" is derived by identifying each subgraph that includes two persons, each of whom has a friends Derived Link with a middle man.

Observable data often arrives in discrete units of tightly interconnected data. This results in the creation of many disconnected subgraphs where each subgraph of observable data is isolated from other subgraphs within the total link oriented data set. This often disconnected nature of data presents a challenge for Link Analysis, as many analytic approaches will operate on each of these data subgraphs in isolation, diminishing the ability to discover new valuable links between entities within the data.

Link induction is an approach which creates new typed links between nodes through comparative analysis of two subgraphs. Specifically, link induction (like the creation of derived links) is the result of an analytical or computational process that preferably considers only features or attributes present (or inherent) in the data set. This is distinct from general link creation which encompasses link creation using knowledge not necessarily present in the data set. The process of link induction is comprised of two phases. The first phase is selection of two subgraphs for comparison, and may be accomplished with many of the well known or previously detailed analytic operations such as type selection or subgraph matching. The second phase is comparison between the selected subgraphs to select candidates to connect with new links.

One exemplary subgraph comparison technique used for inducing links is the process of computing 'nearness' of selected nodes in each subgraph. This 'nearness' operation is used to compare attribute proximity given a distance function, where the distance function may be geospatial ranges, temporal values, phonetic similarity, simple string comparison, or other distance function between literal values assigned to node attributes. Preferably the graph analytics platform software will provide a variety of pre-configured distance functions for the analyst and will also provide the analyst with the power to define custom distance functions as needed during analysis.

Figure 9A:
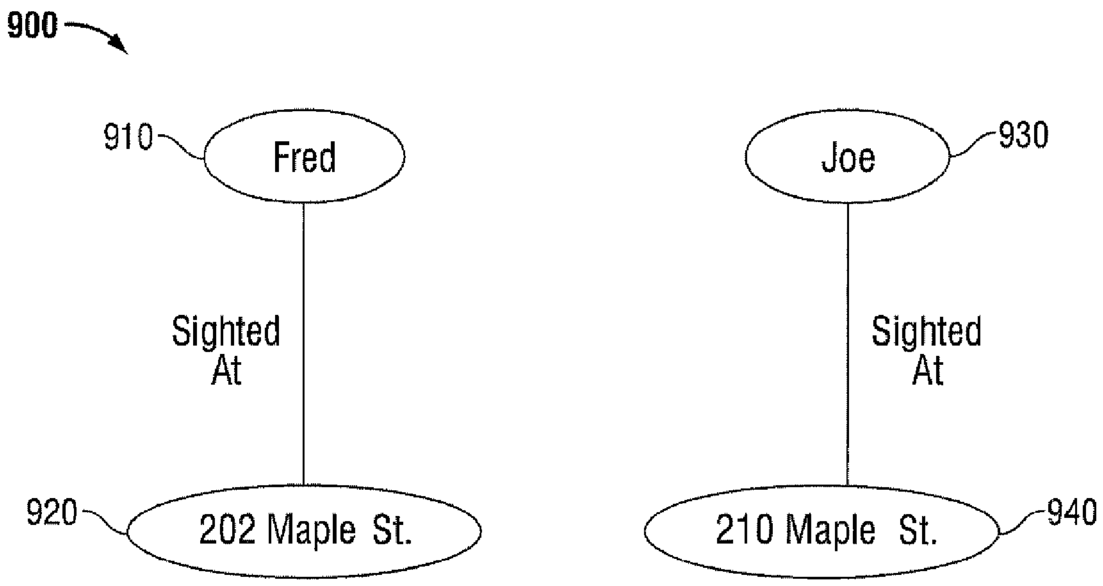
FIGS. 9*a* and 9*b* illustrate an exemplary application of Link Induction based on geospatial nearness.
Figure 9B:
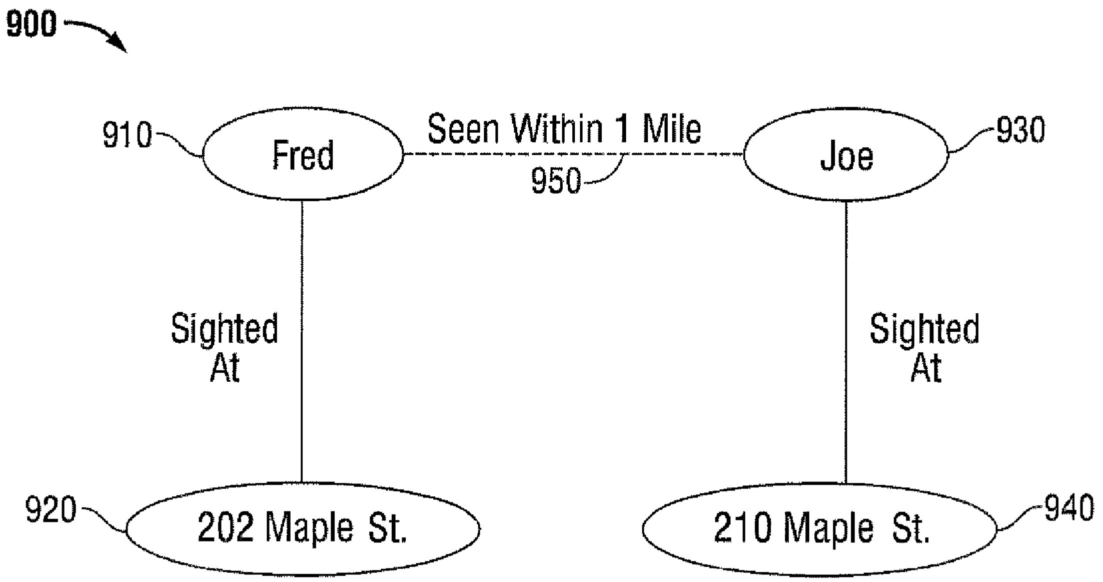

FIGS. 9*a* and 9*b* illustrate how geospatial nearness can be used to induce links between multiple people who were sighted near each other about the same time. FIG. 9*a* depicts disconnected observation data 900 containing two person-nodes representing Fred 910 and Joe 930. The person nodes 910 and 930 are unconnected—there is no link or edge between them to identify any possible connection between them. However, the analyst can specify a distance function in that compares geospatial attribute values (such as, for example, geospatial coordinates and time of day of a confirmed sighting) and induces a link between the nodes whose geospatial attribute values are within an analyst-specified distance from each other. The data set illustrated in FIG. 9*a* includes geospatial attribute values 920, 940 relating to Fred and Joe, namely that Fred has been sighted at 202 Maple St. and Joe has been sighted at 210 Maple Street at or about a specified time. In the example, 202 Maple St. and 210 Maple Street are within a mile of each other. If the analyst-specified distance function is satisfied by a pair of persons with geospatial coordinates of sightings that are within one mile of each other and at or about a specified time, link 950 will be induced between Fred 910 and Joe 930, as illustrated in FIG. 9*b*.

Figure 10A:
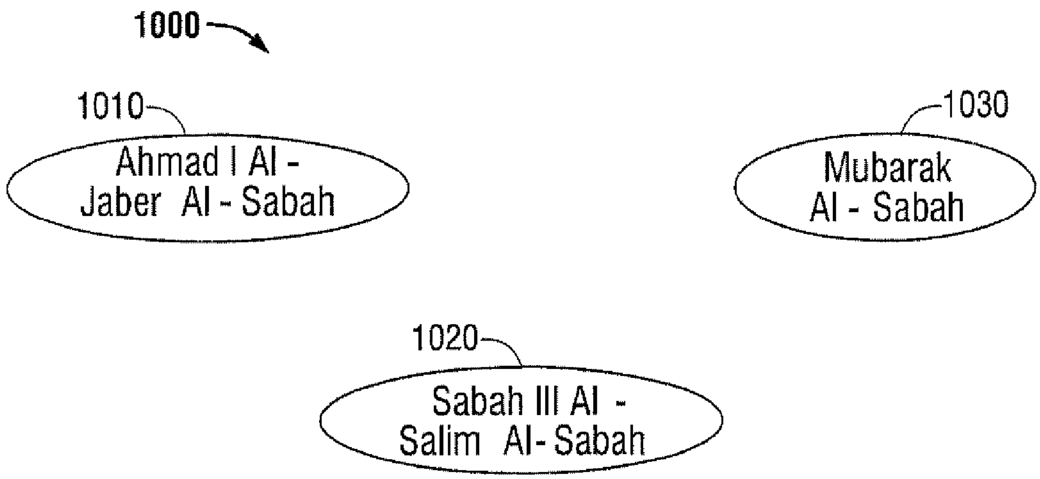
FIGS. 10*a* and 10*b* illustrate an exemplary application of Link Induction based on name similarity.
Figure 10B:
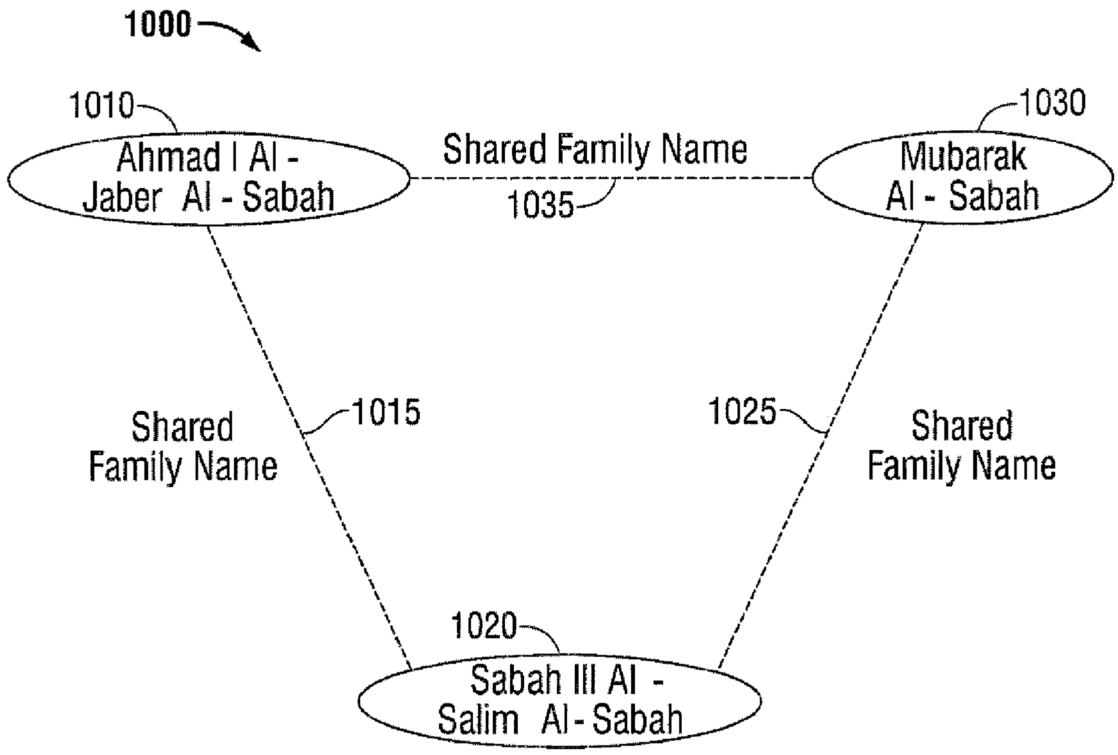

FIGS. 10*a* and 10*b* illustrate an exemplary use of attribute "nearness" to induce links between persons who share similar names such as a familial name such as Al-Sabah, which in turn may identify persons that share a family or tribal or loyalty relationship. FIG. 10*a* shows disconnected observation data 1000 including persons with name attributes Ahmed I Al-Jaber Al-Saha 1010, Sabah III Al-Salim Al-Sabah 1020, and Mubarek Al-Sabah 1030. A distance function can be specified which is satisfied by similarity of names will induce links 1015, 1025 and 1035 between the persons with the same familial name of Al-Sabah, as illustrated in FIG. 10*b*. Geospatial proximity and name similarity are examples of "nearness" based on comparison operations, and alternative comparison operations within the scope of the methods described herein will be familiar to those of ordinary skill in the art.

Although people, and relationships between people, are the primary entities under scrutiny in the foregoing examples, those of ordinary skill in the art will appreciate that the methods described herein are equally applicable to analyzing other types of entities, such as organizations or events, and relationships between the entities.

The link abstraction approaches described herein provide an additional layer of interpretation to the observational data or even other abstraction views. It is important to understand that these abstractions can build on the results of previous abstraction processes. For example, Association Discovery could utilize the results generated from Derived Link processing, which can be built upon data sets containing Induced Links. Further, the abstractions can be chained together in any order. The results of any computation analysis process can become input for any other process. This chaining approach to the abstraction layer provides the analyst a method for leveraging multiple insights to create a more complete understanding of the relevant date for further reasoning. The results of these abstraction approaches can be persisted as edges defined by the pair of endpoints for the link abstraction, and type name for the edge. This persistence form permits the storage of link abstraction results into long term storage, such as a relational database in local or remote persistent storage or a data store, and incorporation into computation processes across analyst sessions.

Figure 11:
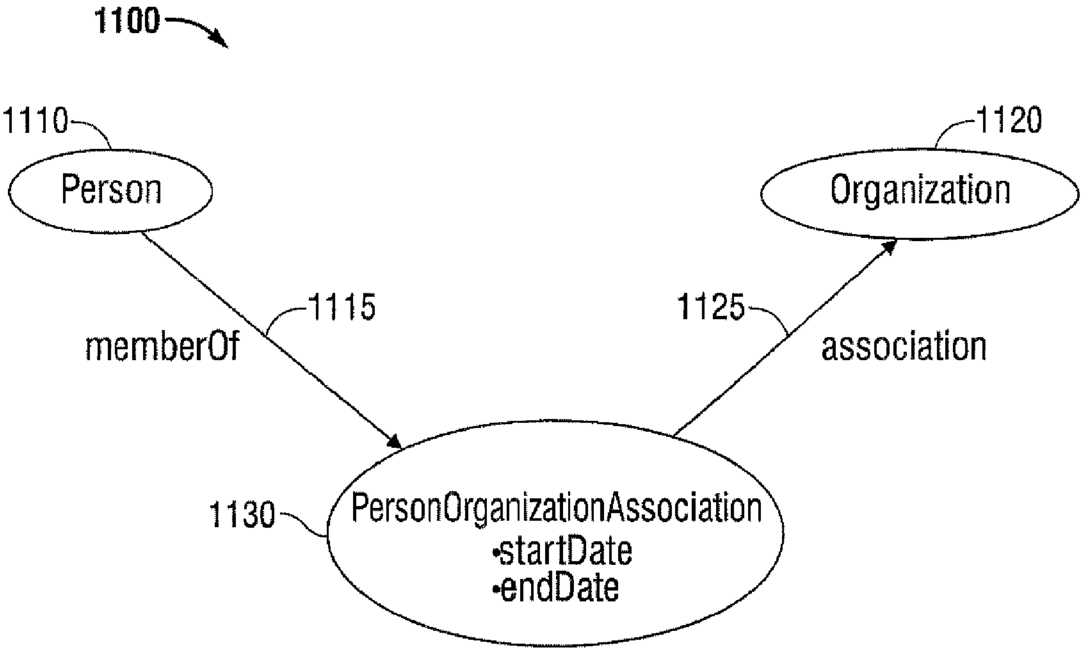
FIG. 11 illustrates an exemplary association node in an embodiment.

Links between nodes may require additional qualifiers to be effective for computational analysis. Social networking analysis (SNA) requires representation and visualization of links between people, which may represent the relationships between them, such as friendships, marriages, coworkers, associates, etc. Such associations can be modeled as nodes with attributes, rather than as links between people. This modeling method allows robust representation of qualities of the association which may be important for analytical understanding. A Person's membership in an organization frequently has discrete temporal aspects, such as the begin/end dates of the association. Observable events may have varying level of confidence dependent on the observation methodology utilized. "association nodes" can be used to capture these qualified links in an embodiment. These association nodes can be stored in the link set as intermediary nodes in a link between graph entities. As illustrated in FIG. 11, exemplary data set excerpt 1100 includes nodes 1110 for a person and 1120 for an organization. The fact that a person 1110 is a member of organization 1120 can be represented by association node 1130, and important data about the membership (such as the startDate and endDate) can be stored as attributes of the association node. Association links 1115 and 1125 link the entities 1110 and 1120 to the association node 1130. However, such modeling comes at a cost of higher model complexity and potentially confusing visualization, since humans typically think of such associations as simple links rather than nodes themselves. Thus the analyst in an embodiment can elect to display the entities 1110 and 1120 with the association node 1130 and association links 1115 and 1125, or the analyst can conceal the association node 1130 and association links 1115 and 1125 and display the association between entities 1110 and 1120 as a single link (not shown).

Data incorporated into a dataset is done selectively based on the intended analysis goals of the system. Over time these intended goals or needs for the system will evolve, and require original principles used in data selection to be reassessed, and new data brought into consideration from original sources. To facilitate origin tracking of data incorporated into the data set, a 'Pedigree' layer is embodied in the system. This pedigree layer tags any data incorporated into the data set with information about the origin or source, and information about the agents or users involved in the data creation, or its modification or deletion. This provides the analyst the ability to return to original sources for insight that may have been lost through the data preparation process.

Figure 12:
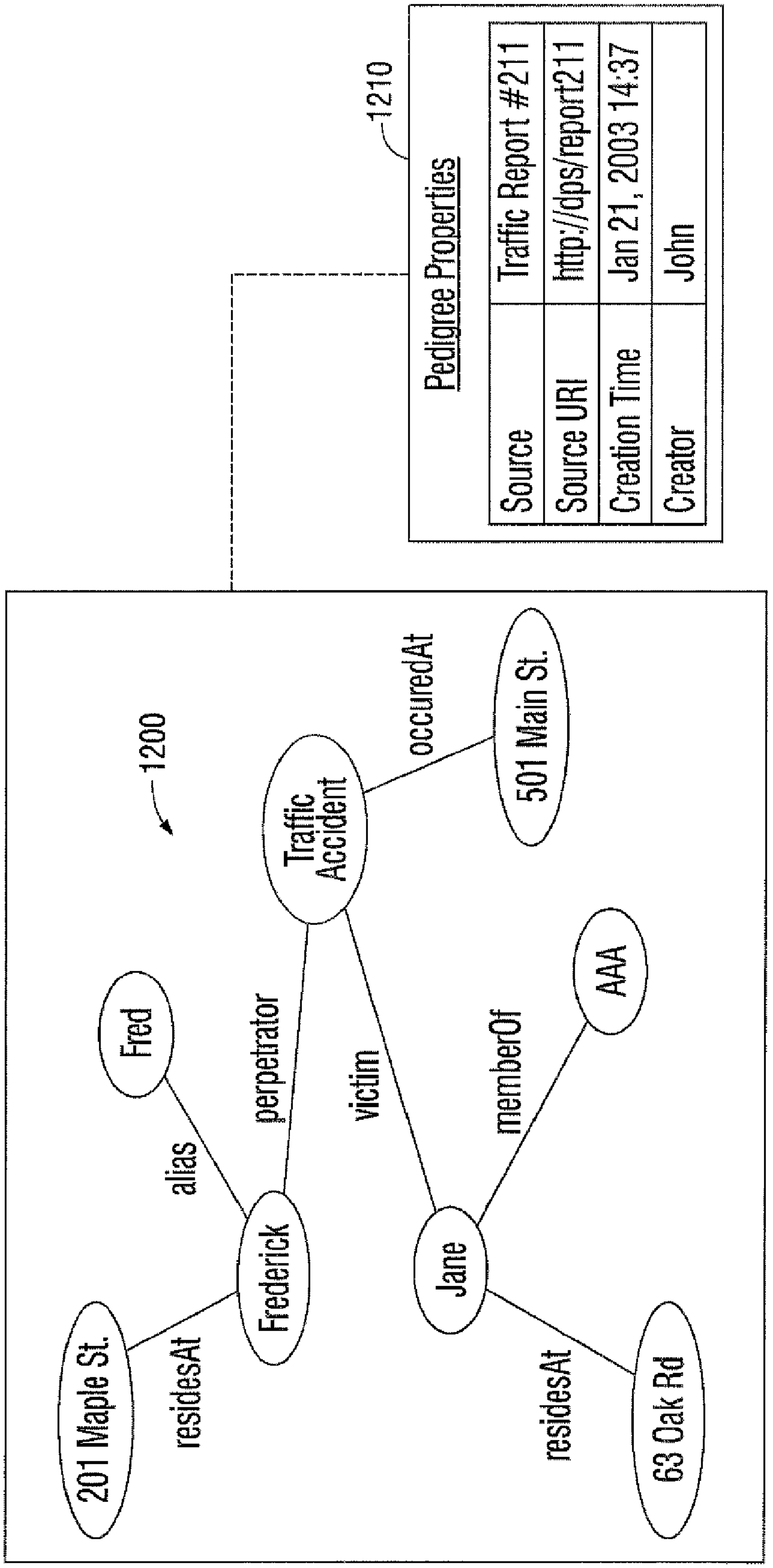
FIG. 12 depicts an exemplary use of pedigree properties in an embodiment.

Pedigree records consist of a plurality of value properties that describe the origin for a group of nodes and edges. This plurality of properties is given a unique identifier, which is subsequently recorded as a property on each affected node and edge in the data set. The unbounded nature of the pedigree properties allows adaptation of the pedigree mechanism to address data from varied sources such as structured databases, records management systems, and unstructured reports. FIG. 12 shows an example of how origin information for data prepared from a traffic report is recorded and associated with the data instances. Data from the traffic report is organized as typed nodes and named edges 1200, and pedigree record 1210 associated with the collection of nodes and edges 1200 includes the source of the information (i.e., Traffic Report No. 211), the URI where the traffic report was found, the date of creation, and the person who created it.

Charting tools facilitate human comprehension and reasoning over results of the data abstraction layers and are valuable to the analysis process. Charting tools provide methods to contextualize the entities and understand the relationships between represented entities. With visualization of large link-oriented datasets, methods must be provided to abstract details, allowing the analyst to focus on entities and relations that are important to provide situational understanding and hiding those that are not relevant to gain this understanding. Finally, charting tools must provide access to the computational link analysis abilities detailed previously to allow new insights to be added into the link abstraction view. Through such charting capabilities, analysts are provided a means to quickly comprehend, investigate, and evaluate link-oriented data.

Link Charting is a method of presenting link-oriented data visually to convey the relational nature of the underlying data. Display of link-oriented data in a link charting visualization is familiar to those skilled in the art, and supported in a range of commercial tools. However, the visualization capabilities in an embodiment provide enhancements through tight integration with computational link analysis methods and visual data abstraction abilities. Preferably, the graph analytics platform software provides for the visual display of link-oriented data and also for production of link-oriented data in other output formats, such as, for example, ESRI shapes or the format used by Google Earth.

Figure 13A:
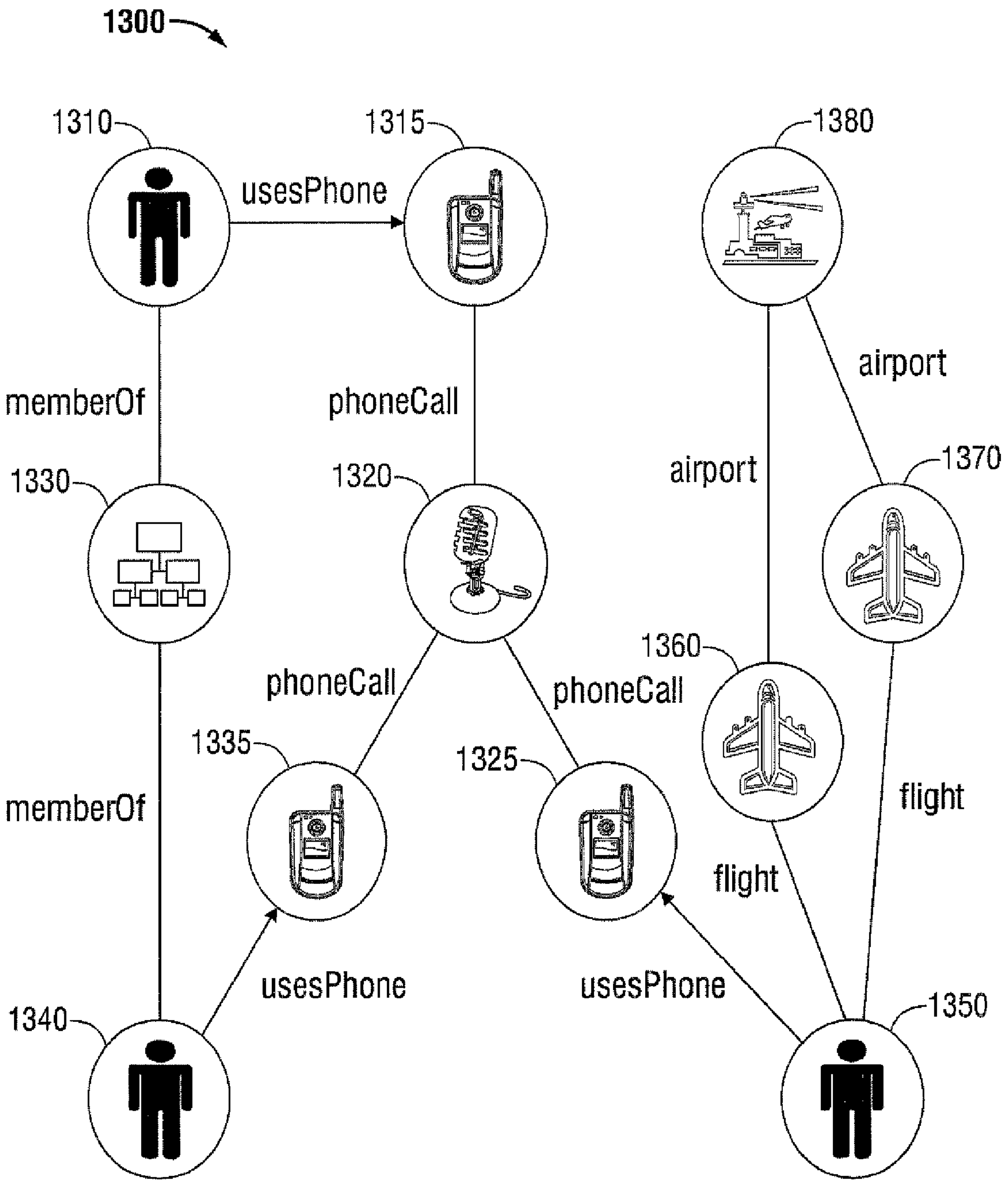
FIGS. 13*a* and 13*b* illustrate an exemplary use of Path Simplification in an embodiment.
Figure 13B:
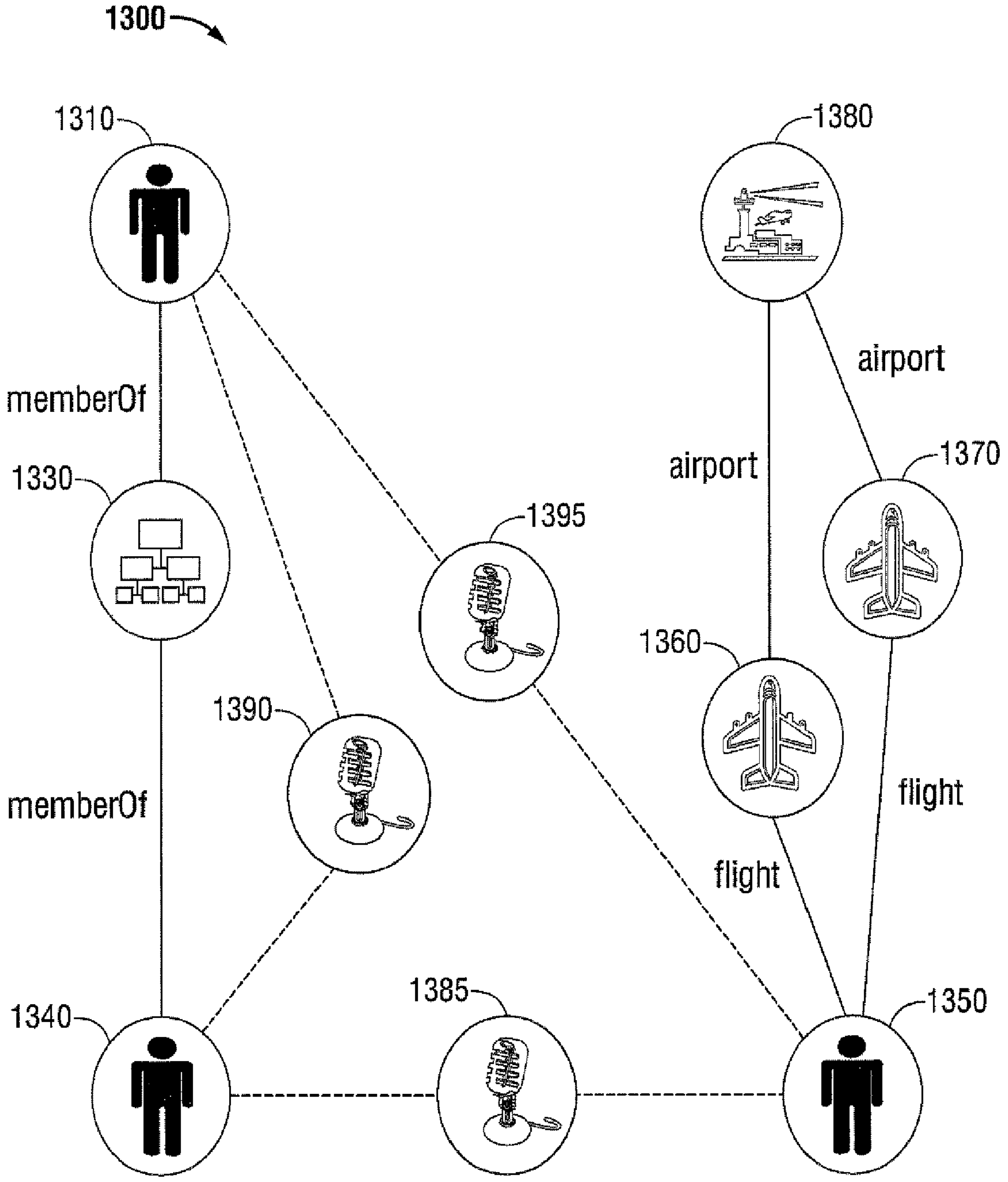

Path Simplification provides a method for abstracting complex paths between nodes into single edge visual representation, while preserving the most significant type representing this path. FIGS. 13*a* and 13*b* illustrate an exemplary use of Path Simplification. FIG. 13*a* illustrates a detailed view of source graph 1300 showing the persons of interest 1310, 1340, and 1350 and the pathways between them showing intermediate nodes 1315, 1320, 1325, 1335 representing the connecting path details associated with phone calls between persons 1310, 1340 and 1350. FIG. 13*b* shows a simplified view in which the intermediate nodes are concealed and replaced with single links 1385, 1390 and 1395 preserving the communication nature of the underlying details of the phone communication. In this way the subgraph representing multiple participants in a phone call is simplified to present direct connectivity between the individuals. Thus details in the link-oriented data set can be reduced to core concepts of interest for analyst understanding and presentation, including the relationship between the connectivity between persons 1310, 1340 and 1350 and person 1350's air travel 1360, 1370 to destination 1380.

The rules for path simplification are defined by indicating the candidate set of node-types that should be simplified. For each of the candidate node types marked for simplification, a list of the entire candidate's relation tuples to preserve must also be recorded. Finally, the candidate simplification nodes are ranked from most to least important concept. With, these simplification rules modeled, candidate nodes can then be replaced by edges representing existence of instances of their relation tuples. Types for the edges can then be assigned based on the type ranking and comparison to connecting edge types.

Geospatial Charting is a method to present geospatial information of given entities in a geospatial coordinate system. A common embodiment of this method is to display entities at specific locations within a map view of a region. Through locating entities as geospatial coordinates, an understanding of proximity between entities and geospatial features can be conveyed, providing additional insight.

Figure 14:
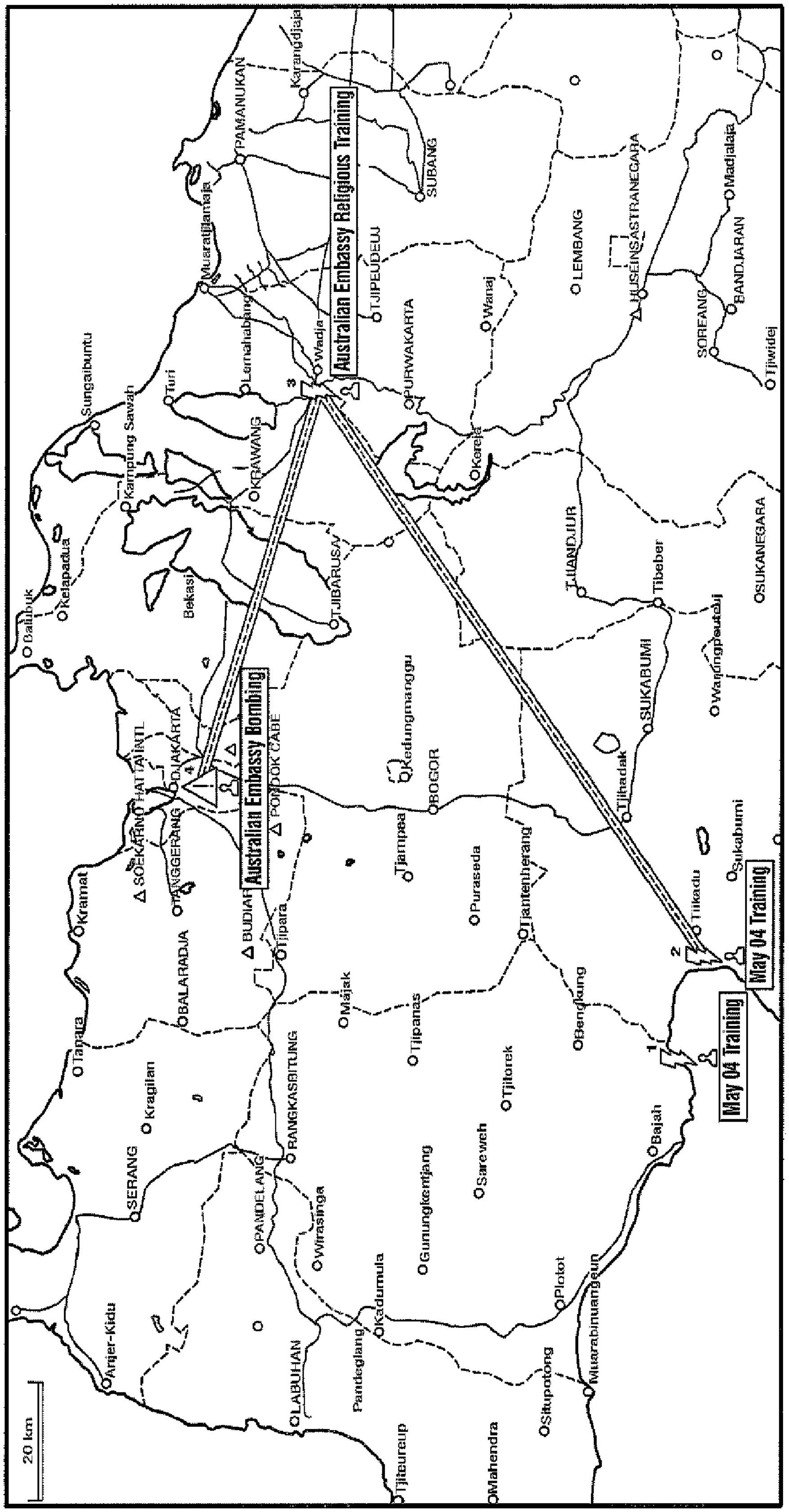
FIG. 14 depicts an exemplary geospatial trajectory chart in an embodiment.

Trajectory tracking is the ability to display movement paths of entities using multiple observation data relations over time. This is done in an automated fashion by interpreting the semantics of relations for a given entity to positional observations. In tracking an individual it is common to have positional events recorded from many methods such as cell phone tower positions, personal observations, sales receipts, and other type events. It is also possible to calculate and present group activity—a plurality of points, representing members of a logical group, based on shared behavior within a given timeframe—within a geospatial perspective. For example: a group of phone devices found to be calling one another and acting as a coordinated group may be plotted in a geospatial context with display elements (e.g., visually bounded by a geometric shape) to suggest the known range of movement and use of the devices. Trajectory tracking combines the location data from these multiple, different events and presents them in an ordered display, preferably in temporal order, as illustrated in exemplary geospatial trajectory chart 1400 in FIG. 14. This tracking provides insight into understanding patterns of behavior and potentially estimating future locations.

Figure 15A:
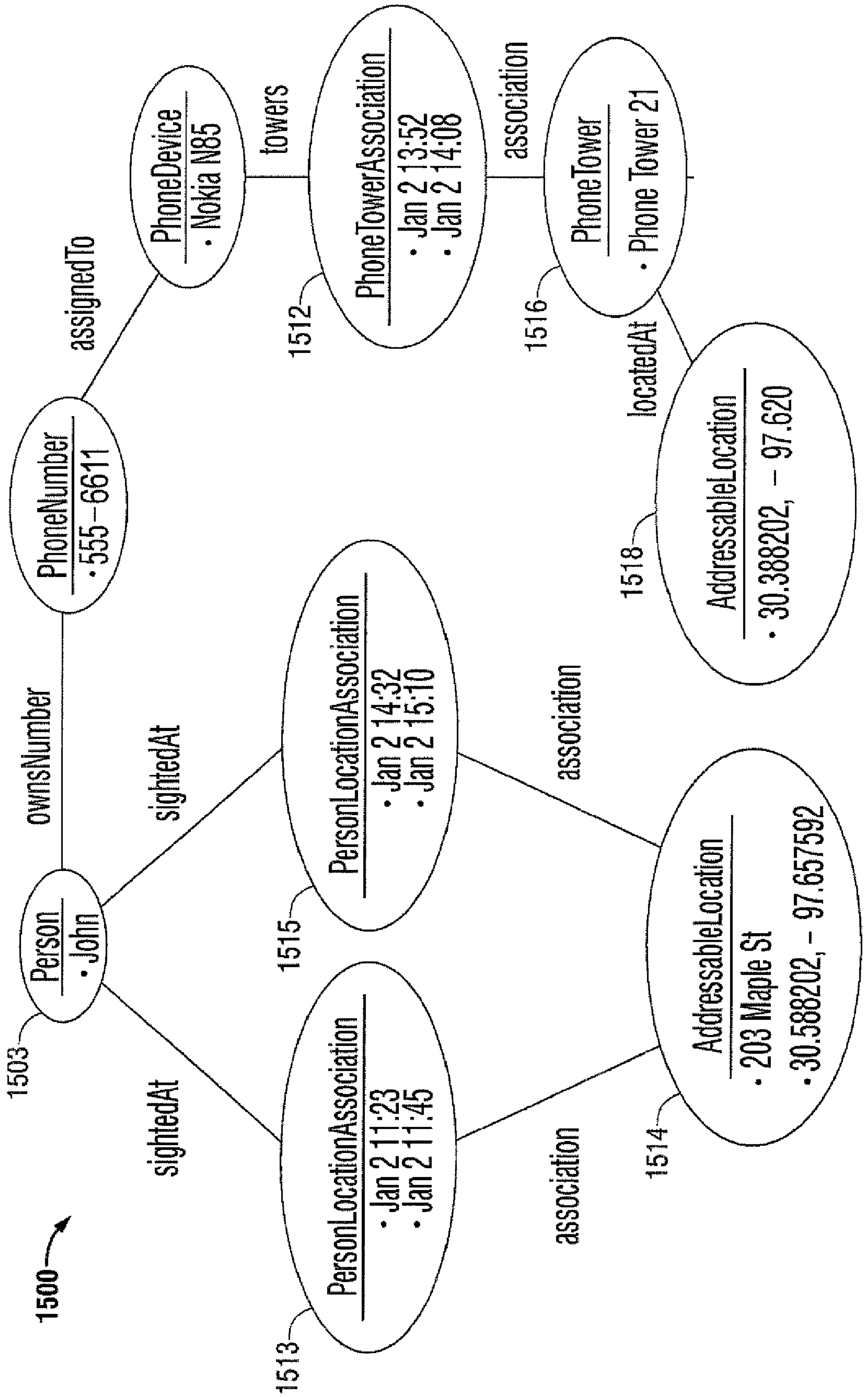
Figure 15B:
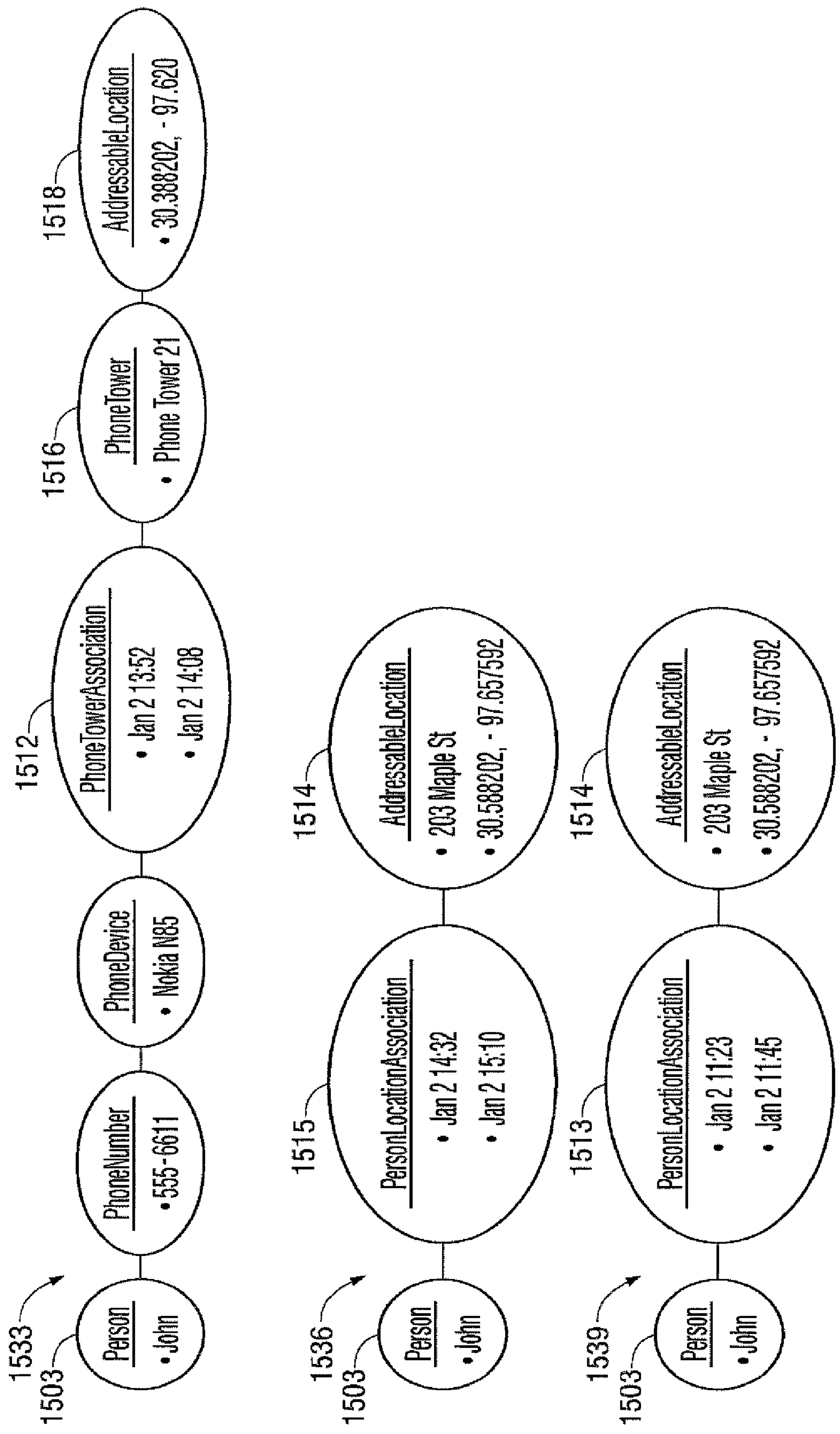

The graph data representing the knowledge of an entity must be converted into a sequence of distinct points in time for trajectory tracking. FIGS. 15*a*, 15*b* and 15*c* illustrate the process by which the trajectory for an individual Person is extracted from the graph model. FIG. 15*a* shows a trajectory source graph 1500. Paths rooted at the tracked entity 1503 are defined within the graph structure for identifying sequence information. These path definitions define the type of entity providing the mappable coordinate, such as a Sighting 1507, 1509, Residence, PhoneCall, or Incident. From these mappable entities, additional paths are defined to indicate the attributes providing coordinate values, and temporal bounds, 1512; 1513, 1514, 1515, 1516, 1518. Additional paths may be defined to incorporate other useful attribute information into the mappable points to assist in comprehension of the charted trajectory as desired. FIG. 15*b* illustrates trajectory path selection by depicting trajectory paths 1533, 1536, 1539 defining mappable points which are extracted from the original source graph data. Each of these path contains the coordinate and time bound values for a mappable point for the subject 1503. FIG. 15*c* illustrates Trajectory Sequence Creation. Using the path definitions, trajectory paths 1533, 1536 and 1539 are converted into row-oriented records 1573, 1576 and 1579 in table 1570 containing coordinate and time information. Additional values may also be included in the results records to provide contextual information for each of these mappable points. The records can be ordered by their start time values to create a time-based sequence of locations for the subject. FIG. 16 shows an exemplary trajectory path definition of one mappable point for a Person node type, which can contain a plurality of these mappable point definitions.

Figure 17:
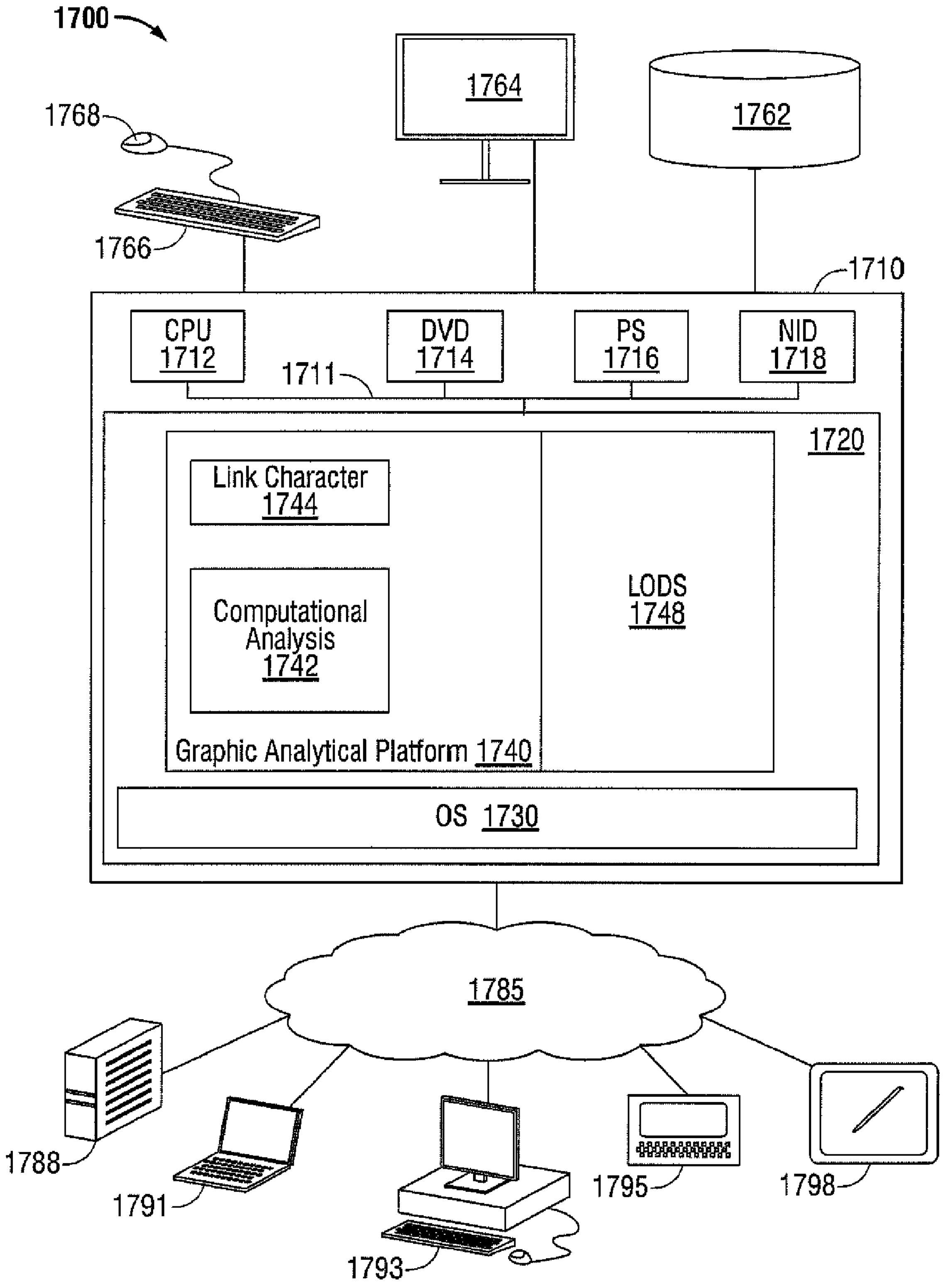
FIG. 17 depicts the components of an embodiment of a system for abstracting information for use in link analysis.

FIG. 17 depicts the components of an embodiment of a computer system 1700 that is programmed to perform the methods described above. In this embodiment, the methods and functions described above are performed by graph analytic platform software implemented in software that is executed by the computer system 1700 although other implementations are within the scope of the invention such as implementing the methods on a hardware device or a combination of hardware and software. In the example shown in FIG. 1700, the system is implemented on computer 1710. In an exemplary embodiment, computer 1710 preferably includes one or more processing units 1712 operatively connected via system bus 1711 to persistent storage units, including hard drive 1716 and CD/DVD drive 1714, network interface device 1718, and memory 1720 that stores the software instructions executed by processing unit 1712 to implement the methods described herein. Computer 1710 preferably includes data store 1762 (which may be local or remote), conventional input/output devices including display 1764, keyboard 1766 and pointing/trackball device 1768. Preferably hard drive 1716 includes least 5 GB of free space. Display 1764 can be local or remote, and includes conventional monitors, printers, any other from of graphic display devices, and virtual display devices such as a specified file.

The size requirements of memory 1720, persistent storage units 1716 and 1714 and data store 1762 will increase depending on size of observational data included into the system. Memory 1720 preferably includes operating system software 1730 which may be conventional, such as Windows or Linux. Memory 1720 also preferably includes link-oriented data set 1748 and the graph analytics platform software 1740, comprising a plurality of lines of program instructions or code which are executed by processor 1712 to perform the methods described herein, including support and operation of the link-oriented dataset 1748 and link analysis and abstracting information for use in link analysis as is discussed herein. In an embodiment, graph analytics platform software 1740 includes computational analysis module 1742 and a Link Charter module 1744 for production of link-oriented data. In an embodiment, Link Charter module 1744 is a client of computational analysis module 1742. In an embodiment, link-oriented dataset 1748 can be stored in or distributed among memory 1720, persistent storage 1714, 1716 and/or data store 1762.

The computer system 1700 may comprise one computer 1710 or in an embodiment one or more computers 1710 interconnected via network 1785 to increase performance of the system as needed. In a preferred embodiment, computer 1710 is a workstation connected via network 1785 to servers 1788 comprising persistent storage, data stores, and other network resources. In another embodiment, computer 1710 is a server in a client-server architecture, with one or more exemplary client devices such as desktop computer 1793, PDA or handheld device 1795, laptop computer 1791, or tablet computer 1798. The system also may be implemented using other computer architectures, including but not limited to a mainframe system with terminals, ASP (application service provider), peer-to-peer, and similar architectures, and network 1785 can include a local area network, a wide area network, the internet, the World Wide Web, a wireless network, a mobile phone network and the like, all of which are within the scope of the invention since the invention is not limited to any particular computer architecture or network. Generally, computer system 1700 can be any, system that provides sufficient computing power, memory, and persistent storage to execute the methods described herein, including link analysis and abstracting information for use in link analysis as is discussed herein.

Those of skill will recognize that the techniques of the embodiments described herein may be implemented to advantage in a variety of sequential orders and that the present invention may be generally implemented in magnetic media such as RAM drives, USB drives, disks, tapes, DVDs and CD-ROMs or other storage media for introduction into a system for abstracting information for use in link analysis. In such cases, program instructions for executing the steps described herein in abstracting information for use in link analysis will be embedded in the media.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. The described embodiments illustrate the scope of the claims but do not restrict the scope of the claims.

What is claimed is:

1. A method of improving the efficiency of computational link analysis performed by a computer system, said computer system comprising one or more processors and computer-usable non-transitory storage media operationally coupled to the one or more processors, comprising:

storing a link-oriented data set in the computer-usable non-transitory storage media, wherein the link-oriented data set comprises collected observable data that has been organized into a plurality of typed nodes, each typed node having one or more node values comprising a node type, and a plurality of typed edges between the typed nodes in the link-oriented data set, said plurality of typed edges comprising a plurality of observable data edge-types;

using a computational process performed by the one or more processors executing software instructions stored in the computer-usable non-transitory storage media, adding a first synthesized edge having a new derived edge-type between a first pair of typed nodes, wherein link derivation has been used to define the new derived edge-type, and a second synthesized edge having a new induced edge-type between a second pair of typed nodes, wherein link induction has been used to define the new induced edge-type, wherein the new derived edge-type and the new induced edge- type are not observable data edge-types, wherein using link derivation to define a new edge-type comprises storing, in the computer-usable non-transitory storage media, software instructions that comprise the new edge-type and specify one or more dataset operations comprising one or more other edge-types, and wherein using link induction to define a new edge-type comprises storing, in the computer-usable non- transitory storage media, software instructions that comprise the new edge-type and specify one or more functions operating on one or more node values;

whereby the synthesized edges reveal associations that are not expressed in the collected observable data; and storing the link-oriented data set with the synthesized edges in the computer-usable non-transitory storage media.

2. The method of improving the efficiency of computational link analysis performed by a computer system of claim 1, further comprising creating a synthesized connected path between a first typed node and a second typed node that reveals an association that is not expressed in the collected observable data, wherein the synthesized connected path comprises a third synthesized edge having a new edge-type, wherein link derivation or link induction have been used to define the new edge-type of the third synthesized edge.

3. The method of improving the efficiency of computational link analysis performed by a computer system of claim 1, further comprising creating a synthesized connected path between a first typed node and a second typed node, wherein the synthesized connected path comprises an intermediate node, a first connected path between the first typed node and the intermediate node, and a second connected path between the intermediate node and the second typed node.

4. The method of improving the efficiency of computational link analysis performed by a computer system of claim 3, wherein the intermediate node data comprises collected observable data.

5. The method of improving the efficiency of computational link analysis performed by a computer system of claim 1, further comprising:

creating a new intermediate node; and creating a synthesized connected path between a first typed node and a second typed node, the synthesized connected path comprising the new intermediate node.

6. The method of improving the efficiency of computational link analysis performed by a computer system of claim 5, wherein the synthesized connected path comprises the new intermediate node, a first connected path between the first typed node and the new intermediate node, a second connected path between the new intermediate node and the second typed node, and at least one of the first or second connected paths comprise a synthesized edge having a new edge-type defined by link derivation or link induction.

7. The method of improving the efficiency of computational link analysis performed by a computer system of claim 5, further comprising storing the link-oriented dataset with the new intermediate node in the computer-usable non-transitory storage.

8. The method of improving the efficiency of computational link analysis performed by a computer system of claim 5, wherein the new intermediate node is an association node.

9. The method of improving the efficiency of computational link analysis performed by a computer system of claim 1, further comprising producing node and edge information.

10. The method of improving the efficiency of computational link analysis performed by a computer system of claim 9, wherein producing node and edge information further comprises displaying one or more nodes and one or more edges between the one or more nodes.

11. The method of improving the efficiency of computational link analysis performed by a computer system of claim 9, wherein producing node and edge information further comprises producing simplified path information.

12. The method of improving the efficiency of computational link analysis performed by a computer system of claim 11, wherein the link-oriented data set comprises a connected path between a first node and a second node, said connected path comprising one or more intermediate nodes, and producing simplified path information comprises selectively producing or excluding from production at least one of the one or more intermediate nodes.

13. The method of improving the efficiency of computational link analysis performed by a computer system of claim 11, wherein the link-oriented data set comprises a connected path between a first node and a second node, said connected path comprising one or more intermediate nodes, and producing simplified path information comprises concealing at least one intermediate node and replacing it with a synthesized edge.

14. The method of improving the efficiency of computational link analysis performed by a computer system of claim 11, wherein the link-oriented data set comprises a connected path between a first node and a second node, said connected path comprising one or more intermediate nodes, and producing simplified path information comprises:

creating a synthesized new edge between the first node and the second node, and producing the synthesized new edge and excluding from production the one or more intermediate nodes.

15. A computer system for improving the efficiency of computational link analysis, comprising:

One or more processors;

Computer-usable non-transitory storage media coupled to the one or more processors;

collected observable data organized as a plurality of typed nodes and a plurality of typed edges between the typed nodes in a link-oriented data set stored in the computer-usable non-transitory storage media, said plurality of typed edges comprising a plurality of observable data edge-types; and software instructions stored in the computer-usable non-transitory storage media which when executed by a processor cause the computer system to add a first synthesized edge having a new derived edge-type between a first pair of nodes, the new derived edge-type defined by link derivation, and to add a second synthesized edge having a new induced edge-type between a second pair of nodes, the new induced edge-type defined by link induction, the nodes in the first and second pair of nodes comprised in the plurality of typed nodes, wherein defining a new edge-type by link derivation comprises storing, in the computer-usable non-transitory storage media, software instructions that comprise the new edge-type and specify one or more dataset operations comprising two or more other edge-types, and defining a new edge-type by link induction comprises storing, in the computer-usable non-transitory storage media, software instructions that comprise the new edge-type and specify one or more functions operating on one or more node values, wherein the new derived edge-type and new induced edge-type are not an observable data edge-type, and wherein the first and second synthesized edges reveal one or more associations that are not expressed in the collected observable data.

16. The computer system for improving the efficiency of computational link analysis of claim 15, further comprising software instructions stored in the computer-usable non-transitory storage media which when executed by the processor cause the computer system to create a new intermediate node and to create a synthesized connected path comprising the new intermediate node between a first typed node and a second typed node.

17. The computer system for improving the efficiency of computational link analysis of claim 16, further comprising software instructions stored in the computer-usable non-transitory storage media which when executed by the processor cause the computer system to use link derivation or link induction to create a new synthesized edge in the synthesized connected path.

18. The computer system for improving the efficiency of computational link analysis of claim 15, further comprising software instructions stored in the computer-usable non-transitory storage media which when executed by the processor cause the computer system to produce simplified path information.

19. The computer system for improving the efficiency of computational link analysis of claim 18, wherein the link-oriented data set comprises a connected path between a first node and a second node, said connected path comprising one or more intermediate nodes, and producing simplified path information comprises concealing at least one intermediate node and replacing it with a synthesized edge.

20. The computer system for improving the efficiency of computational link analysis of claim 18, further comprising a display device, wherein producing simplified path information comprises displaying simplified path information on the display device.

* * * * *